US 7,200,075 B2

(12) United States Patent
Tada et al.

(10) Patent No.: US 7,200,075 B2
(45) Date of Patent: Apr. 3, 2007

(54) OPTICAL DISC APPARATUS SWITCHING FOCUS POINT BETWEEN LAYERS

(75) Inventors: Yukinobu Tada, Yokohama (JP); Yoshinori Ishikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 92 days.

(21) Appl. No.: 10/988,537

(22) Filed: Nov. 16, 2004

(65) Prior Publication Data

US 2005/0088929 A1    Apr. 28, 2005

Related U.S. Application Data

(63) Continuation of application No. 09/935,795, filed on Aug. 24, 2001, now Pat. No. 6,865,141.

(30) Foreign Application Priority Data

Oct. 25, 2000  (JP)  ............................. 2000-332104
May 30, 2001  (JP)  ............................. 2001-162601

(51) Int. Cl.
  *G11B 7/00*  (2006.01)
(52) U.S. Cl. .................. 369/44.28; 369/94; 369/53.28
(58) Field of Classification Search ..................... None
  See application file for complete search history.

(56) References Cited

U.S. PATENT DOCUMENTS

| 5,142,516 | A | | 8/1992 | Fennema |
| 5,289,442 | A | * | 2/1994 | Van Rosmalen ......... 369/44.22 |
| 5,444,682 | A | * | 8/1995 | Yamada et al. ............ 369/30.1 |
| 5,745,461 | A | | 4/1998 | Kawasaki |
| 5,754,507 | A | | 5/1998 | Nishikata |
| 5,757,744 | A | * | 5/1998 | Akkermans .............. 369/44.25 |
| 5,835,460 | A | | 11/1998 | Nishikata |
| 5,978,328 | A | | 11/1999 | Tanaka |
| 6,061,310 | A | | 5/2000 | Iida |
| 6,151,280 | A | | 11/2000 | Naohara et al. |
| 6,178,145 | B1 | | 1/2001 | Hayashi et al. |
| 6,252,834 | B1 | | 6/2001 | Kumagai |
| 6,298,019 | B1 | | 10/2001 | Watanabe et al. |

(Continued)

FOREIGN PATENT DOCUMENTS

JP    63-046625 A    2/1988

(Continued)

*Primary Examiner*—Brian E. Miller
*Assistant Examiner*—Peter Vincent Agustin
(74) *Attorney, Agent, or Firm*—McDermott Will & Emery LLP

(57) ABSTRACT

A focus jump technique enables focus control on recording layers of a disc in such a manner that its effect is not absorbed by disturbance or a variation in the movement speed of an objective lens. The technique involves monitoring level of a focus error signal and rejecting noise from the error signal. A speed sensor detects movement speed of an objective lens; and a speed control circuit generates a voltage for controlling the objective lens, based on the detected movement speed. Movement speed of the objective lens is detected during focus jump, a corresponding lens drive signal is generated, and an end position is determined from behavior of the error signal immediately before the end of the jump. A focus control is pulled, from a focus point corresponding to one recording layer, into a focus point corresponding to another recording layer forcibly in a stable manner.

4 Claims, 16 Drawing Sheets

U.S. PATENT DOCUMENTS

| | | |
|---|---|---|
| 6,298,020 B1 | 10/2001 | Kumagami |
| 6,400,663 B1 | 6/2002 | Okada et al. |
| 6,426,924 B1 | 7/2002 | Yamamiya |
| 6,584,048 B1 | 6/2003 | Tateishi et al. |
| 6,724,697 B2 | 4/2004 | Lee |
| 6,744,709 B2 | 6/2004 | Kobayashi |
| 6,756,574 B2 | 6/2004 | Higuchi |

FOREIGN PATENT DOCUMENTS

| | | |
|---|---|---|
| JP | 02-223023 A | 9/1990 |
| JP | 05-242490 A | 9/1993 |
| JP | 09-050630 | 2/1997 |
| JP | 10-188294 | 7/1998 |
| JP | 10-269581 | 10/1998 |
| JP | 10-302272 | 11/1998 |
| JP | 11-345420 | 12/1999 |
| JP | 11-345421 | 12/1999 |
| JP | 2000-155954 | 6/2000 |

* cited by examiner (a) CASE WHERE A VOLTAGE IS APPLIED TO A VALLEY OF A SURFACE VIBRATION COMPONENT (b) CASE WHERE A VOLTAGE IS APPLIED TO A PEAK OF A SURFACE VIBRATION COMPONENT

OPTICAL DISC APPARATUS SWITCHING FOCUS POINT BETWEEN LAYERS

This application is a continuation of Ser. No. 09/935,795, filed Aug. 24, 2001, now U.S. Pat. No. 6,865,141.

BACKGROUND OF THE INVENTION

1. Field of the Invention

The present invention relates to an optical disc apparatus for optically reproducing a signal from a disc or optically recording and reproducing a signal on and from a disc. In particular, the invention relates to an optical disc apparatus capable of reproducing a signal from a disc having a plurality of recording layers from the disc surface side or recording and reproducing a signal on and from a disc having a plurality of recording layers from the disc surface side.

2. Description of the Related Art

Among the currently standardized digital video discs (or digital versatile discs; hereinafter referred to as "DVDs") are single-surface/single-layer discs, double-surface/single-layer discs, single-surface/double-layer discs, and double-surface/double-layer discs. That is, in contrast to other conventional discs such as compact discs (hereinafter referred to as "CDs") and laser discs (hereinafter referred to as "LDs") that have only one recording layer on one surface, where are DVDs that have two recording layers on one surface to increase the recording capacity.

For example, FIG. 2A shows a single-surface/double-layer disc that is produced by forming a recording layer on each of two 0.6-mm-thick discs, forming a high-reflectance aluminum film and a semitransparent gold film on the respective discs, and bonding together the two discs. FIG. 2B shows a double-surface/double-layer disc that is produced by bonding together two 0.6-mm-thick discs in each of which information is multiplexed in the depth direction.

In the above double-layer discs, information is recorded in each recording layer. When the level of a signal for driving an objective lens is increased gradually as shown in FIG. 2D (it is assumed that the objective lens approaches the disc accordingly), a point (hereinafter referred to as "focus point") where the beam is focused at the lower recording layer (hereinafter referred to as "0th layer") occurs in a focus error signal as shown in FIG. 2C at a certain position of the objective lens. When the objective lens is further elevated, a focus point corresponding to the upper recording layer (hereinafter referred to as "first layer") occurs at a position of the objective lens that is higher than the previous position. In short, in double-layer discs, the beam is focused at each recording layer by moving the objective lens vertically. In CDs and LDs, it is sufficient to focus on the single recording layer on the single surface. On the other hand, in multi-layer discs such as DVDs having two or more planes where information was recorded from one side, unless switching is made from a focus point corresponding to a recording layer at which the beams is currently focused to another focus point corresponding to another recording layer, information stored in the latter recording layer cannot be read out.

The focus point switching between layers (hereinafter referred to as "focus jump") is described in Japanese Unexamined Patent Publication Nos. Hei. 9-50630 and Hei. 11-345420, for example. The method disclosed in the publication No. Hei. 9-50630 is as follows. For example, a focus jump from the 0th layer to the first layer is performed as shown in FIG. 3. For a move from the 0th layer to the first layer, first, the focus servo loop is rendered in an open state or a hold state and the objective lens is accelerated by applying an elevation voltage to the actuator for driving the objective lens. In the interlayer region of the focus position between the 0th layer and the first layer, in a period when the focus error signal is between threshold levels, the voltage application to the actuator is stopped. After the focus error signal has exceeded the upper threshold level, a lowering voltage is applied to the actuator for a prescribed period and the focus servo loop is closed in the vicinity of the focus point corresponding to the first layer to complete the focus jump. This method enables a stable focus jump irrespective of a variation in interlayer distance, noise that is added to the focus error signal, a variation in the sensitivity of the actuator for driving the objective lens, and other factors.

The method disclosed in the publication No. Hei. 11-345420 is as follows. A focus error signal at the end of a deceleration pulse is measured in a focus jump, and the output timing of a deceleration pulse in the next focus jump is corrected by using the measured value. By repeating this operation, optimum output timing of a deceleration pulse in a focus jump is learned through adjustments. This method enables a stable focus jump even in a case where the focus error signal is not balanced properly or has a distorted waveform due to an offset in circuitry, a local variation in disc characteristics, a variation in interlayer distance or reflectance, or a variation in pickup characteristics and maximum acceleration attained by the actuator is small.

SUMMARY OF THE INVENTION

However, the above conventional techniques have the following problems because they do not take into account, in performing a focus jump from one layer at which the beam is focused currently to another layer, a phenomenon called "surface vibration," a noise component that is added to the focus error signal, and disturbance that is introduced during execution of a focus jump. The surface vibration occurs when the disc is not completely flat and is warped or curved or the surface of the disc mounted is not perpendicular to the rotary shaft of a spindle motor because of insufficient mechanical accuracy of a turn table or some other factor.

As shown in FIGS. 4A and 4B, in a state that the servo loop is closed, the voltage of the objective lens drive signal varies according to the surface vibration component to maintain the focused state. Assume that a certain acceleration voltage is applied to perform a focus jump. The speed after the start of acceleration depends on whether the acceleration voltage is added to a valley of the variation of the objective lens drive signal (see FIG. 4A) or a peak portion thereof (see FIG. 4B), for the following reasons. In the case of FIG. 4A, the objective lens moving direction is opposite to the focus jump movement direction and hence the acceleration caused by the applied acceleration voltage is small. On the other hand, in the case of FIG. 4B, the objective lens moving direction is the same as the focus jump movement direction and hence the acceleration caused by the applied acceleration voltage is large.

That is, the degree of acceleration caused by the acceleration voltage depends on the direction in which the objective lens is moving when a focus jump is started. The movement speed of the objective lens when switching is made to a focus point corresponding to another recording layer and deceleration is started varies and hence the degree of deceleration by the deceleration voltage also varies. Since the deceleration voltage is constant, depending on the speed at the start of deceleration, excessive deceleration may cause a return to the focus point corresponding to the previous recording layer or insufficient deceleration may cause passage of the focus point corresponding to the target recording layer. This means a problem that it is difficult to perform a focus jump in a stable manner.

The method of the publication No. Hei. 11-345420 solves the above problem in such a manner that an optimum acceleration voltage and deceleration voltage for a position concerned are learned through several focus jumps to enable a satisfactory focus jump. However, focus jumps are unstable and may fail at a strong possibility until an optimum focus jump is learned. There is another problem that when the movement speed of the objective lens is varied by disturbance or the like during a focus jump, the apparatus cannot absorb influence of the disturbance and the focus jump becomes unstable because data obtained by learning provides a constant acceleration voltage and deceleration voltage.

The method of the publication No. Hei. 11-345420 has still another problem that the circuit scale tends to be large because a large amount of learning data needs to be stored to cope with surface vibration and a local variation in disc characteristics.

A first object of the invention is to provide, by solving the above problems, an optical disc apparatus capable of performing a focus jump in a stable manner without requiring a large amount of memory irrespective of influence of surface vibration, a variation in interlayer distance, noise that is added to the focus error signal, a variation in the sensitivity of the actuator for driving the objective lens, disturbance that is introduced during a focus jump, and other factors.

Previously, DVDs that required a focus jump were ones for reproduction only (e.g., DVD-ROM (DVD-read only memory) and DVD-VIDEO) on which large-capacity image data of a movie for example, a program, or the like is recorded in advance. DVDs for recording (e.g., DVD-RAM (DVD-random access memory), DVD-R (DVD-recordable), and DVD-RW (DVD-rewritable)) had only a single recording layer and hence did not require a focus jump.

Incidentally, digital broadcasts of high-resolution digital moving picture data were started recently. To enable long-term recording of such data in usual homes or the like, large-capacity recording media are necessary. The above-mentioned DVD recording media are insufficient in storage capacity and hence multi-layering of recording discs is indispensable to obtain more capacity.

However, although the capacity is increased by multi-layering a recording surface, a move between layers is needed because of random accessibility that is a merit of the medium of disc; it is necessary to perform a focus jump as performed in DVDs for reproduction only. The above-described conventional techniques give no consideration to the focus jump in discs capable of recording data and have the following problems that relate to the focus jump to be performed during recording.

Where a recording medium having multiple recording layers is used for, for example, recording a digital broadcast of high-resolution digital moving picture data as mentioned above, real-time recording is required in which the broadcast is recorded parallel with its reception and hence all-time recording on the recording media should be enabled. Further, in the case of a disc, there may occur a case that the next recording position is distant from the current recording position. Therefore, a move to a target position should be performed instantaneously. This results in a problem that if a move to a target recording layer fails in a focus jump, another attempt should be started from focusing on the original recording layer, which takes time and makes it difficult to enable all-time recording (data is lost during such an attempt). There is another problem that a recorded portion may be erased erroneously unless a move to a target position is performed correctly during recording.

A second object of the invention is to provide, by solving the above problems, an optical disc apparatus capable of performing a focus jump in a stable manner even during recording in such a manner that in performing a focus jump not only does the optical disc apparatus control the actuator so that the focus position deviates from a target recording layer by monitoring whether the level of the focus error signal exceeds a set threshold level, but also it prevents erroneous erasure of data in a recorded portion by decreasing the laser power to such a value that recording cannot be effected.

To attain the first object, the invention provides an optical disc apparatus having a focus jump function for enabling a focus control on each of a plurality of recording layers of a disc, comprising an objective lens for focusing laser light on a recording layer of the disc; focus error signal. generating means for generating a focus error signal based on reflection light that is obtained through the objective lens; generating means for generating, based on the focus error signal, a focus control signal for controlling the objective lens; drive voltage generating means for outputting a voltage necessary to move the objective lens; moving means for moving the objective lens in a direction approximately perpendicular to the recording layers of the disc in accordance with the output voltage of the drive voltage generating means; and speed detecting means for detecting a movement speed of the objective lens, wherein a movement speed of the objective lens is detected during a focus jump, a lens drive signal corresponding to the detected movement speed is supplied to the moving means, and an end position of the focus jump is determined based on behavior of the focus error signal immediately before an end of the focus jump, whereby a focus control is pulled, from a focus point corresponding to one recording layer, into a focus point corresponding to another recording layer forcibly in a stable manner.

Further, the invention provides an optical disc apparatus having a focus jump function for enabling a focus control on each of a plurality of recording layers of a disc, comprising an objective lens for focusing laser light on a recording layer of the disc; focus error signal generating means for generating a focus error signal based on reflection light that is obtained through the objective lens; generating means for generating, based on the focus error signal, a focus control signal for controlling the objective lens; drive voltage generating means for outputting a voltage necessary to move the objective lens; moving means for moving the objective lens in a direction approximately perpendicular to the recording layers of the disc in accordance with the output voltage of the drive voltage generating means; and means for monitoring a level of the focus error signal, wherein a movement speed of the objective lens is detected during a focus jump, a lens drive signal corresponding to the detected movement speed is supplied to the moving means, and an end position of the focus jump is determined based on behavior of the focus error signal immediately before an end of the focus jump, whereby a focus control is pulled, from a focus point corresponding to one recording layer, into a focus point corresponding to another recording layer forcibly in a stable manner.

Further, the invention provides an optical disc apparatus having a focus jump function for enabling a focus control on each of a plurality of recording layers of a disc, comprising an objective lens for focusing laser light on a recording layer of the disc; focus error signal generating means for generating a focus error signal based on reflection light that is obtained through the objective lens; generating means for generating, based on the focus error signal, a focus control signal for controlling the objective lens; drive voltage generating means for outputting a voltage necessary to move the objective lens; moving means for moving the objective lens in a direction approximately perpendicular to the recording layers of the disc in accordance with the output voltage of the drive voltage generating means; means for monitoring a level of the focus error signal, speed detecting means for detecting a movement speed of the objective lens; and speed control voltage generating means for generating a voltage for controlling the objective lens based on the movement speed detected by the speed detecting means, wherein a movement speed of the objective lens is detected during a focus jump, a lens drive signal corresponding to the detected movement speed is supplied to the moving means, and an end position of the focus jump is determined based on behavior of the focus error signal immediately before an end of the focus jump, whereby a focus control is pulled, from a focus point corresponding to one recording layer, into a focus point corresponding to another recording layer forcibly in a stable manner.

Furthermore, the invention provides an optical disc apparatus having a focus jump function for enabling a focus control on each of a plurality of recording layers of a disc, comprising an objective lens for focusing laser light on a recording layer of the disc; focus error signal generating means for generating a focus error signal based on reflection light that is obtained through the objective lens; generating means for generating, based on the focus error signal, a focus control signal for controlling the objective lens; drive voltage generating means for outputting a voltage necessary to move the objective lens; moving means for moving the objective lens in a direction approximately perpendicular to the recording layers of the disc in accordance with the output voltage of the drive voltage generating means; means for rejecting noise from the focus error signal; means for monitoring a level of a signal obtained by rejecting the noise form the focus error signal; speed detecting means for detecting a movement speed of the objective lens; and speed control voltage generating means for generating a voltage for controlling the objective lens based on the movement speed detected by the speed detecting means, wherein a movement speed of the objective lens is detected during a focus jump, a lens drive signal corresponding to the detected movement speed is supplied to the moving means, and an end position of the focus jump is determined based on behavior of the focus error signal immediately before an end of the focus jump, whereby a focus control is pulled, from a focus point corresponding to one recording layer, into a focus point corresponding to another recording layer forcibly in a stable manner.

To attain the second object, the invention provides an optical disc apparatus having a focus jump function for enabling a focus control on each of a plurality of recording layers of a disc-on and from which data can be recorded and reproduced, comprising an objective lens for focusing laser light on a recording layer of the disc; focus error signal generating means for generating a focus error signal based on reflection light that is obtained through the objective lens; generating means for generating, based on the focus error signal, a focus control signal for controlling the objective lens; drive voltage generating means for outputting a voltage necessary to move the objective lens; moving means for moving the objective lens in a direction approximately perpendicular to the recording layers of the disc in accordance with the output voltage of the drive voltage generating means; means for controlling power of a laser that is used for recording and reproducing data on and from the disk; means for detecting whether a focus position of the objective lens will deviate from a recording layer; and control means for starting, when a focus jump becomes necessary during data recording, the focus jump after switching laser light power that is currently made high to enable the data recording to a low power for reproduction, wherein when a focus jump is performed, whether a focus position of the objective lens will deviate from a destination recording layer is detected and deviation from the destination recording layer is prevented by controlling the moving means, whereby the focus jump can be performed stably during data recording.

DESCRIPTION OF THE PREFERRED EMBODIMENTS

Figure 1:
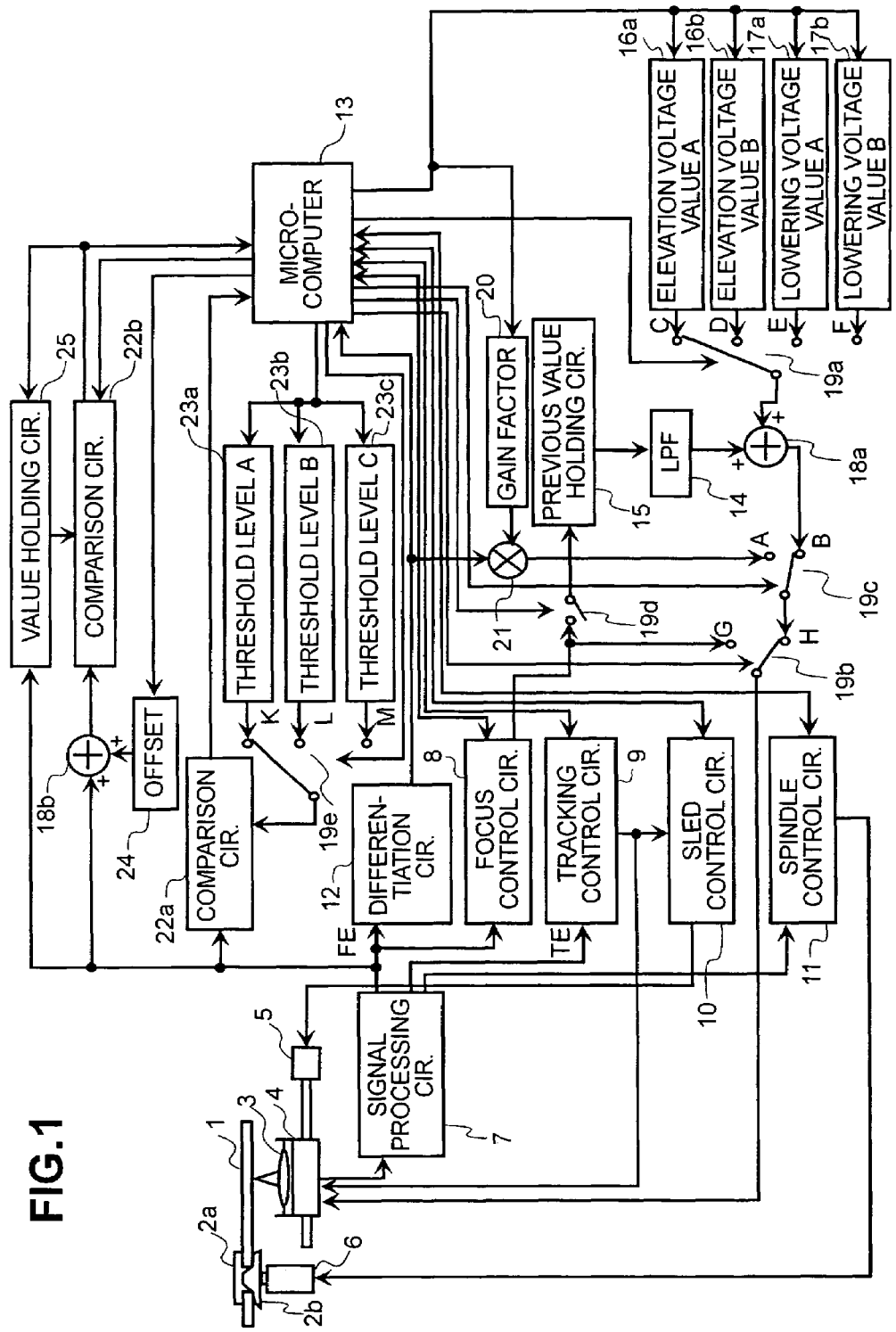
FIG. 1 is a block diagram showing an optical disc apparatus and a focus jump method according to an embodiment of the present invention.
Figure 2:
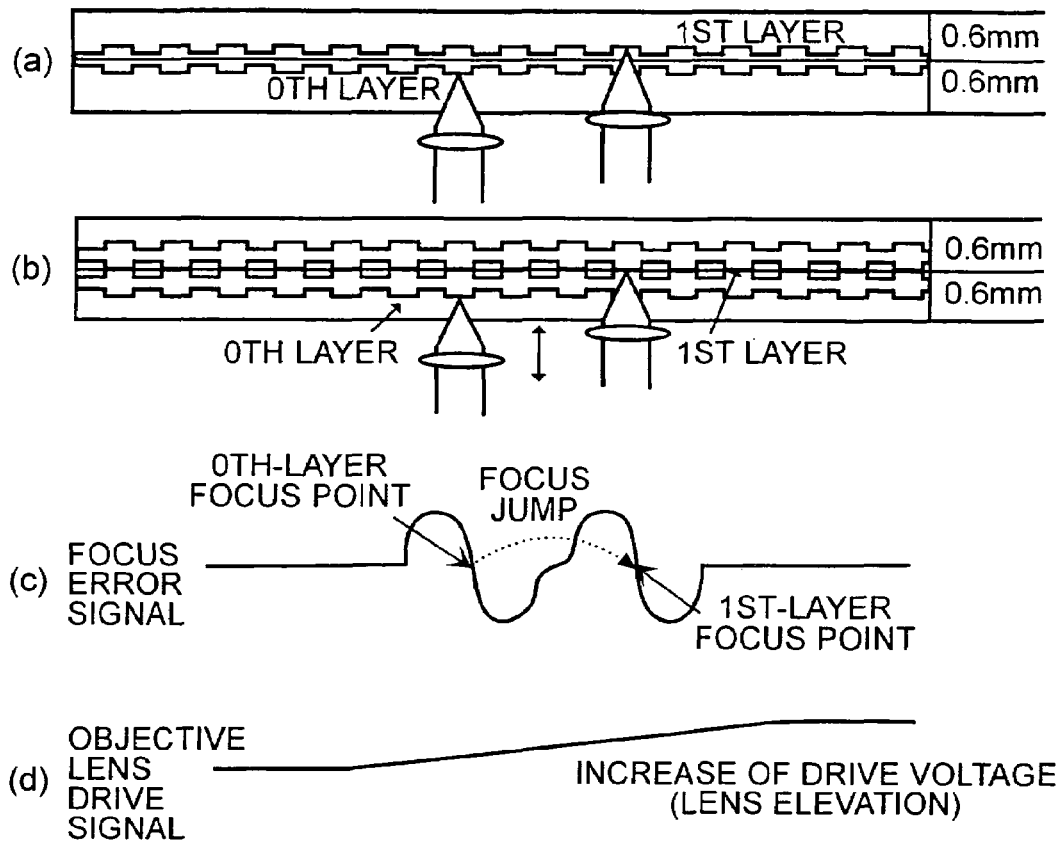
FIGS. 2A–2D show the structures of two-layer discs and outline a focus jump that is performed in those discs.
Figure 3:
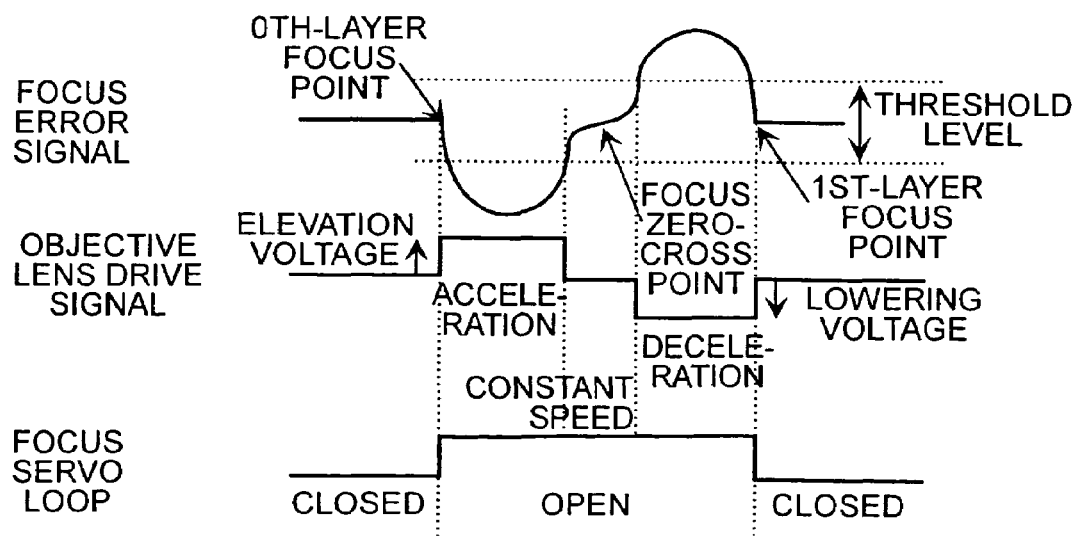
FIG. 3 shows an example of an objective lens drive signal for a focus jump in a conventional optical disc apparatus.
Figure 4:
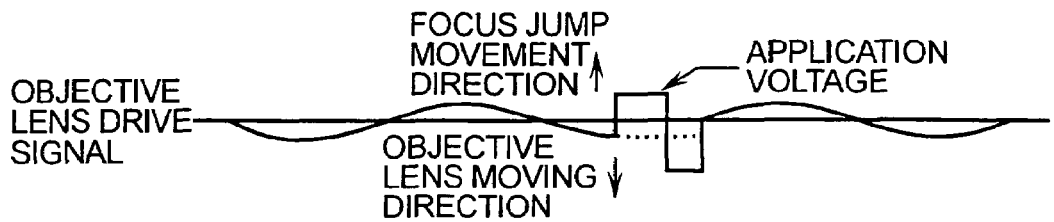
FIGS. 4A and 4B show examples of timing, with respect to a surface vibration component, of applying a voltage for a focus jump in a conventional optical disc apparatus.
Figure 4:
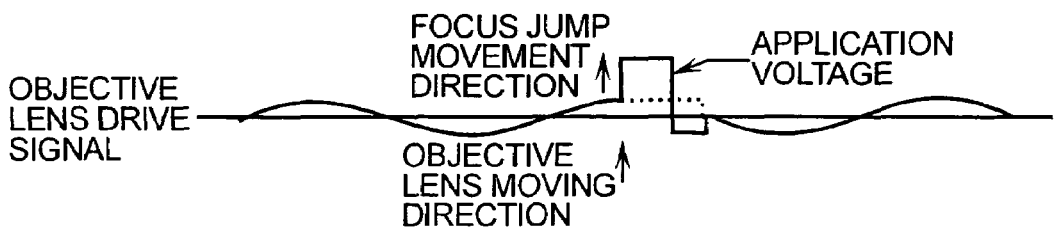

First, main symbols used in the drawing denote the following:

1 . . . Optical disc; 3 . . . Objective lens; 4 . . . Pickup; 7 . . . Signal processing circuit; 8 . . . Focus control circuit; 9 . . . Tracking control circuit; 12 . . . Differentiation circuit; 13 . . . Microcomputer; 14 . . . Low-pass filter; 15 . . . Previous value holding circuit; 16 . . . Elevation voltage value; 16a . . . Elevation voltage value A; 16b . . . Elevation voltage value B; 17 . . . Lowering voltage value; 17a . . . Lowering voltage value A; 17b . . . Lowering voltage value B; 18, 18a, 18b . . . Adder; 19a–19c, 19e . . . Changeover switch; 19d . . . On/off switch; 20 . . . Gain factor; 21 . . . Multiplier; 22, 22a, 22b . . . Signal level comparison circuit; 23a . . . Threshold level A; 23b . . . Threshold level B; 23c . . . Threshold level C; 24 . . . Offset value; 25 . . . Value holding circuit; 26 . . . Deviation-from-layer preventing elevation voltage; 27 . . . Deviation-from-layer preventing lowering voltage; 28a . . . Threshold level A; 28b . . . Threshold level B; 28c . . . Threshold level C; 28d . . . Threshold level D; and 29 . . . Laser power control circuit.

Embodiments of the present invention will be hereinafter described with reference to the accompanying drawings.

FIG. 1 is a block diagram showing an optical disc apparatus and a focus jump method according to an embodiment of the invention. Reference symbol 1 denotes a disc having two or more recording layers on one side; 2a, a clamper; 2b, a turn table; 3 . . . an objective lens; 4, a pickup; 5, a sled motor; 6, a spindle motor; 7, a signal processing circuit; 8, a focus control circuit; 9, a tracking control circuit; 10, a sled control circuit; 11, a spindle control circuit; 12, a differentiation circuit; 13, a microcomputer; 14, a low-pass filter (hereinafter referred to as "LPF"); 15, a previous value holding circuit; 16a, an elevation voltage value A; 16b, an elevation voltage value B; 17a, a lowering voltage value A; 17b, a lowering voltage value B; 18a and 18b, adders; 19a–19c, changeover switches; 19d, an on/off switch; 19e, a changeover switch; 20, a gain factor; 21, a multiplier; 22a and 22b, signal level comparison circuits; 23a, a threshold level A; 23b, a threshold level B; 23c, a threshold level C; 24, an offset value; and 25, a value holding circuit.

Figure 7:
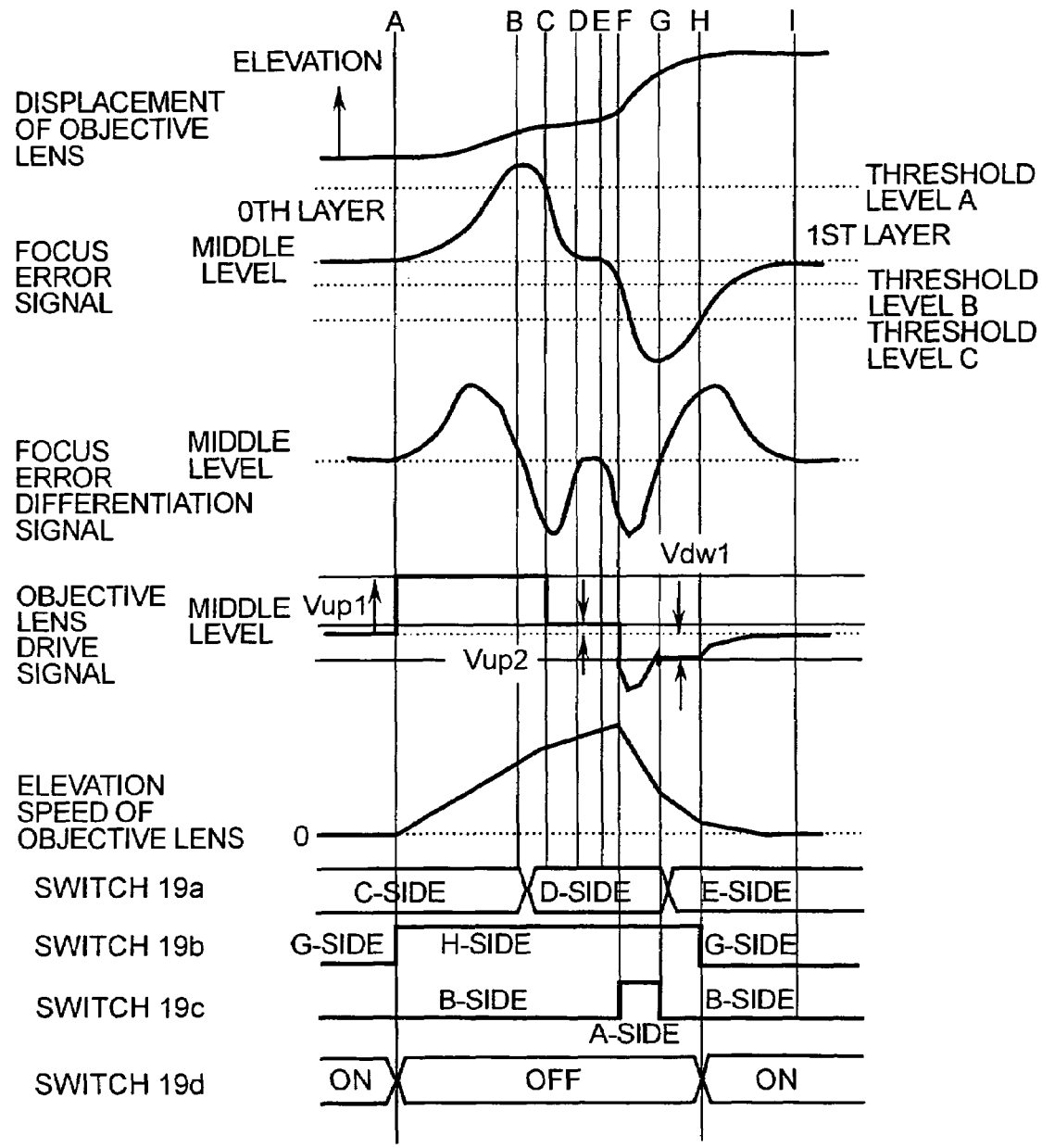
FIG. 7 is a timing chart showing a specific example of how individual circuits operate in a focus jump from a 0th-layer focus point to a first-layer focus point in the optical disc apparatus of FIG. 1.

FIG. 7 shows, with the horizontal axis as a time axis, schematic waveforms of an objective lens displacement, a focus error signal, a focus error differentiation signal, an objective lens drive signal, and an objective lens movement speed and operations of the switches 19a–19d.

As shown in FIG. 1, the disc 1 that has been set on the turn table 2b is fixed to the turn table 2b by the damper 2a. The disc 1 is rotated as the spindle motor 6 is rotated.

To read out information on the disc 1, the microcomputer 13 supplies an emission control signal to a semiconductor laser that is incorporated in the pickup 4.

Figure 5:
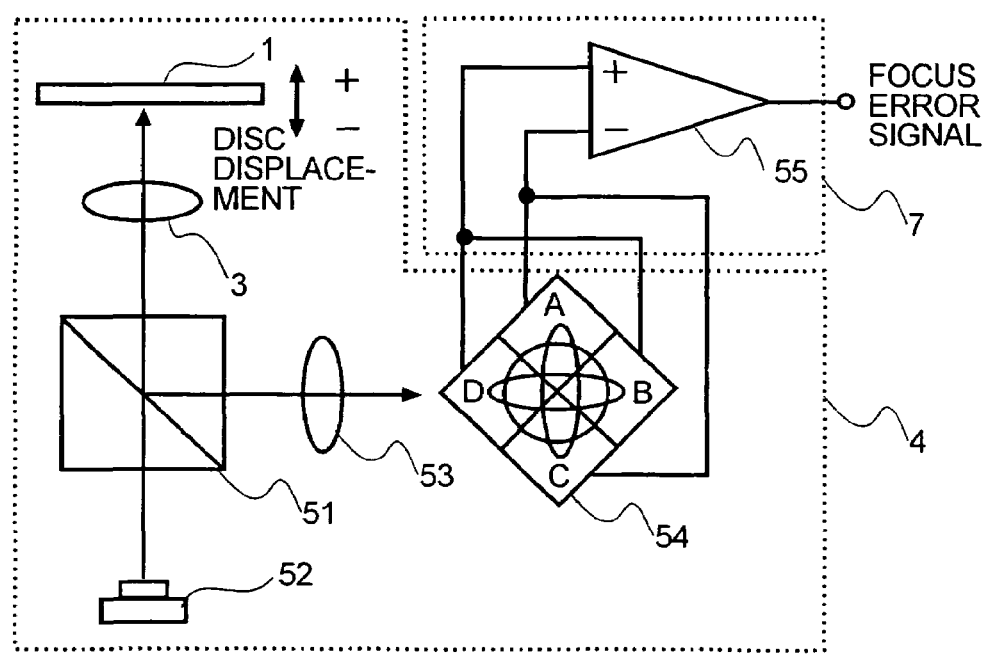
FIG. 5 shows a configuration of a pickup shown in FIG. 1 and a specific example of a signal processing circuit for processing a focus error signal.

FIG. 5 shows a configuration of the pickup 4 including the semiconductor laser and an optical system as well as a configuration for focus error signal detection of the signal processing circuit 7. Reference numeral 1 denotes the disc; 3, the objective lens; 51, a half prism; 52, the semiconductor laser; 53, a condenser lens; 54, a photodetector; and 55, an error calculation unit (error amplifier).

In FIG. 1, a light beam emitted from the semiconductor laser 52 passes through the half prism 51, is given converging action by the objective lens 3, and forms a beam spot on the disc 1. After being reflected by the disc 1, the laser beam again passes through the objective lens 3, is reflected by the half prism 51, passes through the condenser lens 53, and forms a spot on the photodetector 54.

A specific structure of the photodetector 54 for detecting a focus error signal will be described below.

The photodetector 54 consists of four areas A–D in which areas on each diagonal line are paired with and connected electrically to each other. The photodetector 54 is located at such a position that when the objective lens 3 is focused on the disc 1, the beam spot on the photodetector 54 assumes a circle and hence an output of the error amplifier 55 obtained by amplifying the difference between the sums of outputs of the diagonal areas of the photodetector 54 becomes zero. If the disc 1 is deviated vertically from the focus position of the objective lens 3, the beam spot on the photodetector 54 assumes an ellipse that is longer in the vertical direction or horizontal direction. Based on this phenomenon, a focus error signal (FE signal) as shown in FIG. 6 that reflects the amount and direction of a deviation from the focus position is obtained from the error amplifier 55 (what is called the astigmatism method).

Figure 6:
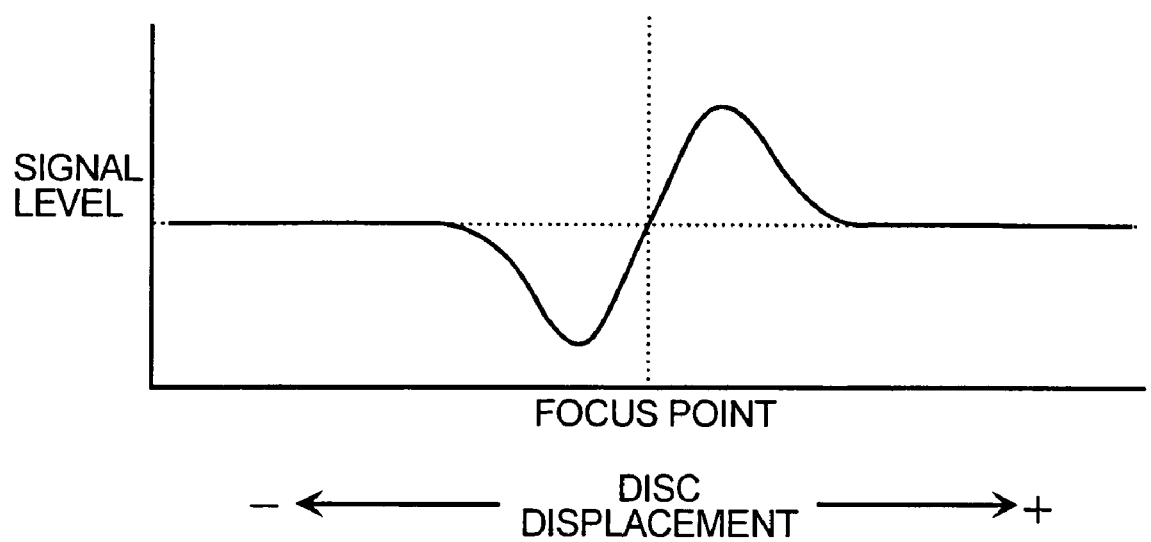
FIG. 6 is a graph showing how a focus error signal varies depending on a disc deviation.

In FIG. 6, the horizontal axis represents the distance between the objective lens 3 and the disc 1 and the vertical axis represents the level of a focus error signal. The focus error signal has a feature that its S-shaped curve crosses the zero level when the objective lens 3 is focused on a disc recording layer. The S-shaped curve may have opposite polarities depending on how the outputs of the photodetector 54 are connected to the error amplifier 55. In the case of a system in which the S-shaped curve has opposite polarities, naturally it is proper to consider that the relationship between the signal level and the disc displacement is opposite.

The focus error signal generated by the error amplifier 55 is supplied to the focus control circuit 8 (see FIG. 1), which generates, by using a delay compensator, a lead compensator, etc., and outputs a drive signal for an actuator (not shown) for moving the objective lens 3, to enable a feedback control in the vicinity of the zero-cross point of an S-shaped curve of the focus error signal. The output signal is supplied to the changeover switch 19b. In a steady state, the changeover switch 19b is switched to the G-side according to an instruction from the microcomputer 13 and thereby supplies a focus control signal to the pickup 4 as a drive signal. The vertical position of the objective lens 3 is controlled according to this drive signal and a feedback loop focus control is realized, whereby the disc 1 always stays at a focus position.

On the other hand, a tracking error signal (TE signal) generated by the signal processing circuit 7 is supplied to the tracking error control circuit 9, which generates a drive signal for moving the objective lens 3 in the tracking direction by a feedback control. This drive signal is supplied to the pickup 4. The position of the objective lens 3 is controlled in the tracking direction according to the drive signal that is supplied to the inside of the pickup 4, and a feedback loop tracking control is thereby realized. The beam spot is always located on pits that are formed in a recording layer of the disc 1. The drive signal that is output from the tracking control circuit 9 is also supplied to the sled control circuit 10, which generates a drive signal for controlling the sled motor 5 in accordance with the deviation of the objective lens 3 in the tracking direction. The sled motor 5 is driven according to the drive signal received, whereby a sled (base) of the pickup 4, that is, the pickup 4 itself, is moved.

Further, the signal processing circuit 7 supplies the spindle control circuit 11 with rotation cycle information that is read from the disc 1. The spindle control circuit 11 generates a signal for driving the spindle motor 6 based on the received rotation cycle information and supplies it to the spindle motor 6.

In a steady state, the focus, tracking, spindle, and sled controls are performed in the above-described manners with the objective lens 3 focused on a recording layer.

Where the disc 1 is a DVD having two recording layers on one side, there may occur a case that it is necessary to switch from a focus point corresponding to a recording layer at which the beam is focused to another focus point corresponding to the other recording layer. A description will be made below of an exemplary case that the objective lens 3 is located at such a position as to be focused on the 0th recording layer and it is desired to move the focus position of the objective lens 3 to the first recording layer (i.e., it is desired to jump from a focus point corresponding to the lower (0th) recording layer to a focus point corresponding to the upper (first) recording layer).

In a steady state, a drive signal for driving the objective lens 3 that is output from the focus control circuit 8 being in a state that a focus point corresponding to the 0th recording layer is established is supplied to the on/off switch 19*d*. Since the on/off switch 19*d* is closed in this steady state, the drive signal is supplied to the previous value holding circuit 15 as it is. The previous value holding circuit 15 continues to hold, as it is, a value that has been held so far and supplies it to the LPF 14 until the value of the drive signal changes. The LPF 14 has such a frequency characteristic as to reject high-frequency components (noise components) of the signal for driving the objective lens 3 and not to reject low-frequency components such as a surface vibration component that is caused by rotation of the disc 1 having a warp or the like. As such, the LPF 14 rejects mainly noise components from the drive signal and supplies a resulting signal to the adder 18*a*. In a steady state, the components to the LPF 14 always operate.

To cause a focus jump to a focus point corresponding to the first recording layer, the microcomputer 13 sets, in drive voltage generation circuits, initial values of drive voltages necessary for the focus jump, that is, a constant elevation voltage value A (16*a*) and a constant elevation voltage value B (16*b*) that are acceleration voltage values and a constant lowering voltage value A (17*a*) and a constant lowering voltage value B (17*b*) that are deceleration voltage values necessary to decelerate and stop, after acceleration, the objective lens 3 at a position corresponding to a first-layer focus point. Further, the microcomputer 13 sets, in their setting circuits, initial values of a threshold level A (23*a*), a threshold level B (23*b*), a threshold value C (23*c*), an offset value 24, and a gain factor 20. After setting those initial values, the microcomputer 13 switches the changeover switches 19*b* and 19*c* to the H-side and the B-side, respectively, and opens the on/off switch 19*d*. As a result of the switching of the changeover switch 19*b* and the on/off switch 19*d*, the feedback loop by which the objective lens 3 has been controlled so far is made an open loop and the feedback control is stopped.

Then, the microcomputer 13 issues, to the changeover switch 19*a*, an instruction to switch to the C-side, whereby the elevation voltage value A (16*a*) is supplied to the adder 18*a*. The adder 18*a* adds the elevation voltage value A (16*a*) to a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied to the pickup 4 via the changeover switch 19*b*. Since the elevation voltage value A (16*a*) is applied to the actuator, the objective lens 3 starts to go up.

In FIG. 7, time point A is a start point of the focus jump. The elevation voltage value A (16*a*; also denoted by "Vup1" in FIG. 7) is applied, as it is, as an objective lens drive signal, to the actuator for driving the objective lens 3.

Referring to FIG. 1, a focus error signal that is output from the signal processing circuit 7 is supplied to the differentiation circuit 12. The differentiation circuit 12 differentiates the received focus error signal. The differentiation circuit 12 may be a high-pass filter (HPF) that performs differentiation with respect to time in a prescribed band.

The focus error signal that is output from the signal processing circuit 7 is also supplied to the comparison circuit 22*a*, the adder 18*b*, and the value holding circuit 25.

FIG. 7 shows a focus error signal and a focus error differentiation signal (hereinafter abbreviated as "differentiation signal") that occur when a focus jump from a focus point corresponding to the 0th recording layer to a focus point corresponding to the first recording layer is performed. Those signals will be described below in detail for each of sections that are defined by time points A–I.

When the objective lens 3 goes up after the focus jump was started at time point A, the focus error signal rises gradually from a level close to the middle level until time point B. In this section from time point A to B, the differentiation signal rises gradually from a level close to the middle level, reaches a maximum value, then gradually decreases, and finally returns to the middle level (zero) at time point B when the focus error signal has a maximum value. As the objective lens 3 goes up further, at time point D the focus position enters the interlayer region between the 0th recording layer and the first recording layer. The focus error signal decreases gradually from the maximum value and reaches the middle level (zero). In the section from time point B to D, the differentiation signal decreases from the middle level (zero), reaches a minimum value, then increases gradually, and finally reaches the middle level (zero) again. In the section from time point D to E that corresponds to the interlayer region, both of the focus error signal and the differentiation signal are at the middle level (zero). As the objective lens 3 goes up further, the focus position enters the first layer region and hence the focus error signal falls gradually from a level close to the middle level until time point G. In the section from time point E to G, the difference signal falls gradually from a level close to the middle level, reaches a minimum value, then gradually increases, and finally reaches the middle level (zero) at time point G when the focus error signal has a minimum value. As the objective lens 3 goes up further, a first-layer focus point is established at time point I. The focus error signal gradually increases from the minimum value and reaches the middle level (zero). In the section from time point G to I, the differentiation signal increases from the middle level (zero), reaches a maximum value, then decreases gradually, and finally reaches the middle level (zero). At time point I when the first-layer focus point is established, the focus error signal and the differentiation signal reach the respective middle levels (zero).

By using the differentiation signal, more specifically, by detecting a time point (zero-cross point) when the differentiation signal crosses the middle level (zero), a position of the objective lens 3 corresponding to time point B can be detected easily and reliably. Although time point B can also be detected by monitoring the level of the focus error signal, the detection is not reliable because the amplitude of the focus error signal varies depending on the disc, for example, and hence is not uniform.

Therefore, the differentiation signal that is output from the differentiation circuit 12 is supplied to the microcomputer 13. The microcomputer 13 detects that the objective lens 3 has passed a position corresponding to time point B by detecting a time point (zero-cross point) when the differentiation signal received reaches the middle level (zero).

When detecting, first time, the position corresponding to time point B, the microcomputer 13 issues, to the changeover switch 19e, an instruction to switch to the K-side, whereby the value of the threshold level A (23a) is supplied to the comparison circuit 22a. The comparison circuit 22a compares the focus error signal that is supplied from the signal processing circuit 7 with the threshold level A (23a) and supplies a comparison result to the microcomputer 13. As the objective lens 3 goes up further, the level of the focus error signal becomes lower than the threshold level A (23a) at time point C, whereupon the comparison circuit 22a supplies a comparison detection signal to the microcomputer 13. When receiving the comparison detection signal, the microcomputer 13 switches the changeover switch 19a to the D-side, whereby the elevation voltage value B (16b) is supplied to the adder 18a.

The adder 18a adds the elevation voltage value B (16b) to a signal that is free of high-frequency noise components (rejected by the LPF 14), and supplies a resulting addition signal to the changeover switch 19c. Since the changeover switch 19c is switched to-the B-side, the addition signal is supplied from the changeover switch 19c to the changeover switch 19b as it is. Since the changeover switch 19b is switched to the H-side, the addition signal is supplied to the pickup 4 via the changeover switch 19b. Since the elevation voltage value B (16b) is applied to the actuator, the objective lens 3 continues to go up.

As shown in FIG. 7, after the elevation voltage value switching time point C, the elevation voltage value B (16b; also denoted by "Vup2") is supplied, as it is, to the actuator for driving the objective lens 3. The elevation voltage value B (16b) is set smaller than the elevation voltage value A (16a). Therefore, the elevation speed of the objective lens 3 is lower than when the elevation voltage value A (16a) was applied to the actuator. After time point C has been passed, the microcomputer 13 issues, to the changeover switch 19e, an instruction to switch to the L-side. The changeover switch 19e supplies the threshold level B (23b) to the signal level comparison circuit 22a. The signal level comparison circuit 22a compares the level of the focus error signal that is supplied from the signal processing circuit 7 with the threshold level B (23b). When the level of the focus error signal becomes lower than the threshold level B (23b) (time point F in FIG. 7), the signal level comparison circuit 22a supplies a signal to that effect to the microcomputer 13. When detecting that time point F has been passed, to apply a voltage value for decelerating the objective lens 3 that has continued to go up, the microcomputer 13 issues, to the changeover switch 19c, an instruction to switch to the A-side.

At this time, the focus error signal that is output from the signal processing circuit 7 is supplied to the differentiation circuit 12. A differentiated version of the focus error signal generated by the differentiation circuit 12 is supplied to the multiplier 21. The multiplier 21 supplies the changeover switch 19c with a result obtained by multiplying the output (differentiation signal) of the differentiation circuit 12 by the gain factor 20. Since the changeover switch 19c is switched to the A-side, the multiplication result is supplied to the changeover switch 19b as it is. The signal obtained by multiplying the differentiation signal by the gain factor 20 is supplied, as a deceleration signal, to the actuator via the changeover switch 19b.

In the section from time point F to G, the focus error signal reflects the displacement of the objective lens 3 (it decreases monotonously). Since in general speed is obtained by differentiating displacement with respect to time, a signal obtained by differentiating the focus error signal represents the speed of the objective lens 3. For example, if a high elevation voltage has been applied to the actuator and hence an elevation speed of the objective lens 3 when switching is made to the deceleration voltage is high, the focus error signal falls steeply from time point F to G. Therefore, a signal obtained by differentiating such a focus error signal has a large value, that is, the deceleration voltage has a large value, which means that the force of decreasing the elevation speed of the objective lens 3 is strong. Conversely, if a low elevation voltage has been applied to the actuator and hence an elevation speed of the objective lens 3 when switching is made to the deceleration voltage is low, the focus error signal falls gently from time point F to G. Therefore, a signal obtained by differentiating such a focus error signal has a small value, that is, the deceleration voltage has a small value, which means that the force of decreasing the elevation speed of the objective lens 3 is weak.

A deceleration voltage value corresponding to an elevation speed of the objective lens 3 can be obtained and the elevation speed of the objective lens 3 can be decreased by using a signal obtained by differentiating the focus error signal from time F to G in the above-described manner. The gain factor 20 is used for adjusting the amplitude of the deceleration voltage that is obtained by differentiating the focus error signal.

The objective lens 3 continues to go up even after the application of the deceleration voltage to the actuator. After time point F has been passed, the microcomputer 13 monitors the focus error signal and detects its minimum value.

A method for detecting a minimum value will be described below.

A focus error signal that is output from the signal processing circuit 7 is supplied to the adder 18b and the value holding circuit 25. The adder 18b adds together the offset value 24 and the focus error signal that is supplied from the signal processing circuit 7, and supplies a resulting signal to the comparison circuit 22b. The offset value is used for preventing erroneous detection of a minimum value when the focus error signal is influenced by noise or the like. According to an instruction from the microcomputer 13, the comparison circuit 22b compares the offset-value-added output of the adder 18b with the output of the value holding circuit 25. If the output value of the adder 18b is smaller than the output value of the value holding circuit 25, the comparison circuit 22b supplies a comparison result signal to the value holding circuit 25. In response to the comparison result signal, the value holding circuit 25 updates the value that has been held so far to the value of the focus error signal.

Figure 11:
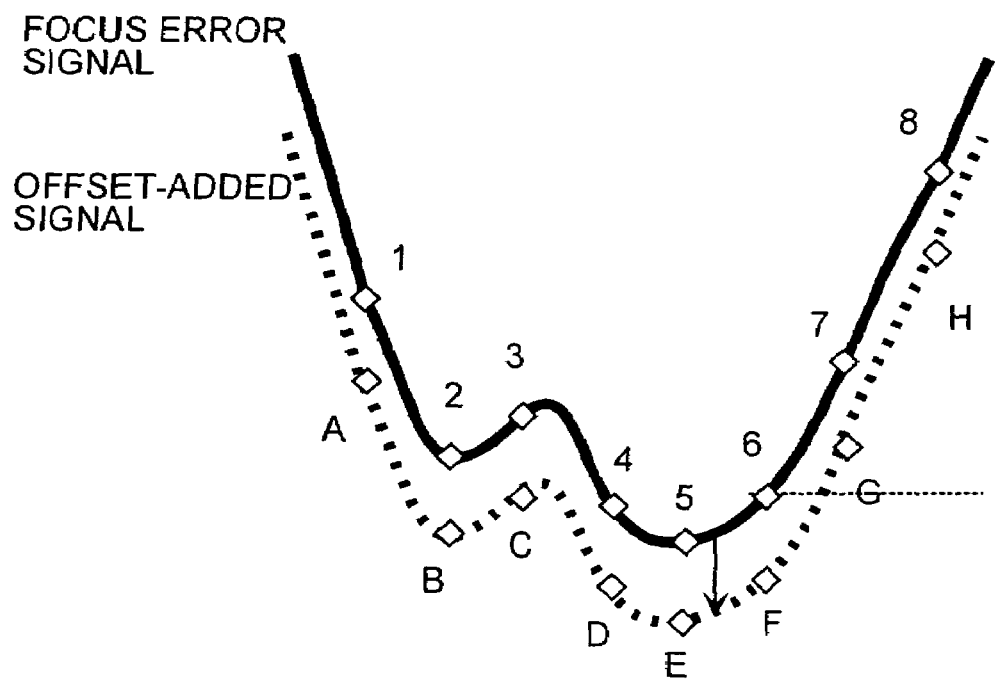
FIG. 11 shows a specific method for detecting a minimum value of a focus error signal by means of a value holding circuit shown in FIG. 1.

FIG. 11 schematically shows how a minimum value is detected.

In FIG. 11, the solid line represents a focus error signal and a dotted line represents a signal obtained by adding an offset value to the focus error signal. Where no offset value is added to the focus error signal, that is, the offset value is zero, the solid line representing the focus error signal coincides with the dotted line representing the offset-value-added signal. In this case, first, a value of point 1 is held by the value holding circuit 25 as a minimum value. Then, this minimum value is compared with a value of point 2. Since the value of point 2 is smaller than the minimum value, the former is employed as a new minimum value. Then, the new minimum value is compared with a value of point 3. Since the value of point 3 is larger than the minimum value, the minimum value is not updated; the value of point 2 is finally judged as a minimum value of the focus error signal.

A description will now be made of a case where an offset signal is added to a focus error signal.

In the case of detecting a minimum value, the offset value is made a negative value. As a result, a signal obtained by adding the offset value to the original signal (in this case, the focus error signal) has smaller values than the original signal. To detect a minimum value, first, a value of point 1 is held by the value holding circuit 25 as a minimum value. Then, the minimum value is compared with a value of point B obtained by adding the offset value to a value of point 2. Since the value of point B is smaller than the minimum value, the value of point 2 is employed as a new minimum value. Then, the new minimum value is compared with a value of point C that is obtained by adding the offset value to a value of point 3. Since the value of point C is smaller than the minimum value, the value of point 3 is employed as a new minimum value. Then, the new minimum value is compared with a value of point D that is obtained by adding the offset value to a value of point 4. Since the value of point D is smaller than the minimum value, the value of point 4 is employed as a new minimum value. Then, the new minimum value is compared with a value of point E that is obtained by adding the offset value to a value of point 5. Since the value of point E is smaller than the minimum value, the value of point 5 is employed as a new minimum value. Then, the new minimum value is compared with a value of point F that is obtained by adding the offset value to a value of point 6. Since the value of point F is smaller than the minimum value, the value of point 6 is employed as a new minimum value. Then, the new minimum value is compared with a value of point G that is obtained by adding the offset value to a value of point 7. Since the value of point G is larger than the minimum value, the minimum value is not updated; the value of point 6 is finally judged as a minimum value of the focus error signal.

In the example of FIG. 11, the actual minimum value of the focus error signal is the value of point 5. Where the offset value is added to the focus error signal, the value of point 6 is finally judged as a minimum value of the focus error signal. However, if no offset signal is added to the focus error signal, the value of point 2 is finally judged as a minimum value of the focus error signal.

By using a signal obtained by adding an offset value to a focus error signal, a minimum value can be detected without being influenced by noise or disturbance whose amplitude is smaller than the offset value.

The microcomputer 13 judges that time point G has been passed, at a time point when the comparison result signal comes to indicate that the minimum value of the focus error signal has not been updated. When detecting the passage of time point G, to stop stably the objective lens 3 that is about to make a transition from ascent to descent and to establish a first-layer focus point (time point I in FIG. 7), the microcomputer 13 issues, to the changeover switches 19a and 19c, instructions to switch to the E-side and the B-side, respectively. Switched to the E-side, the changeover switch 19a outputs the lowering voltage value A (17a). The adder 18a adds together the lowering voltage value A (17a) and a signal that is free of high-frequency noise components (rejected by the LPF 14), and supplies a resulting addition signal to the changeover switch 19c. Since the changeover switch 19c is switched to the B-side, the addition signal is supplied from the changeover switch 19c to the changeover switch 19b as it is. Since the changeover switch 19b is switched to the H-side, the addition signal is supplied, via the changeover switch 19b, to the pickup 4, where it is applied to the actuator for driving the objective lens 3. Because of the application of the lowering voltage value A (17a) to the actuator, the elevation speed of the objective lens 3 is decreased and the objective lens 3 stops ascending.

After the objective lens 3 has passed the position corresponding to time point G, the microcomputer 13 issues, to the changeover switch 19e, to switch to the M-side, whereby the threshold level C (23c) is supplied to the comparison circuit 22a. The comparison circuit 22a compares the focus error signal that is supplied from the signal processing circuit 7 with the threshold level C (23c), and supplies a comparison result to the microcomputer 13. Further, after the objective lens 3 has passed the position corresponding to time point G, the microcomputer 13 monitors the focus error signal and detects its maximum value.

A method for detecting a maximum value will be described below.

A focus error signal that is output from the signal processing circuit 7 is supplied to the adder 18b and the value holding circuit 25. The adder 18b adds together the offset value 24 and the focus error signal that is supplied from the signal processing circuit 7, and supplies a resulting signal to the comparison circuit 22b. According to an instruction from the microcomputer 13, the comparison circuit 22b compares the output of the adder 18b with the output of the value holding circuit 25. If the output value of the adder 18b is larger than the output value of the value holding circuit 25, the comparison circuit 22b supplies a comparison result signal to the value holding circuit 25. In response to the comparison result signal, the value holding circuit 25 updates the value that has been held so far to the value of the focus error signal.

In this manner, the maximum value of values, input so far, of the focus error signal is always held by the value holding circuit 25.

Figure 12:
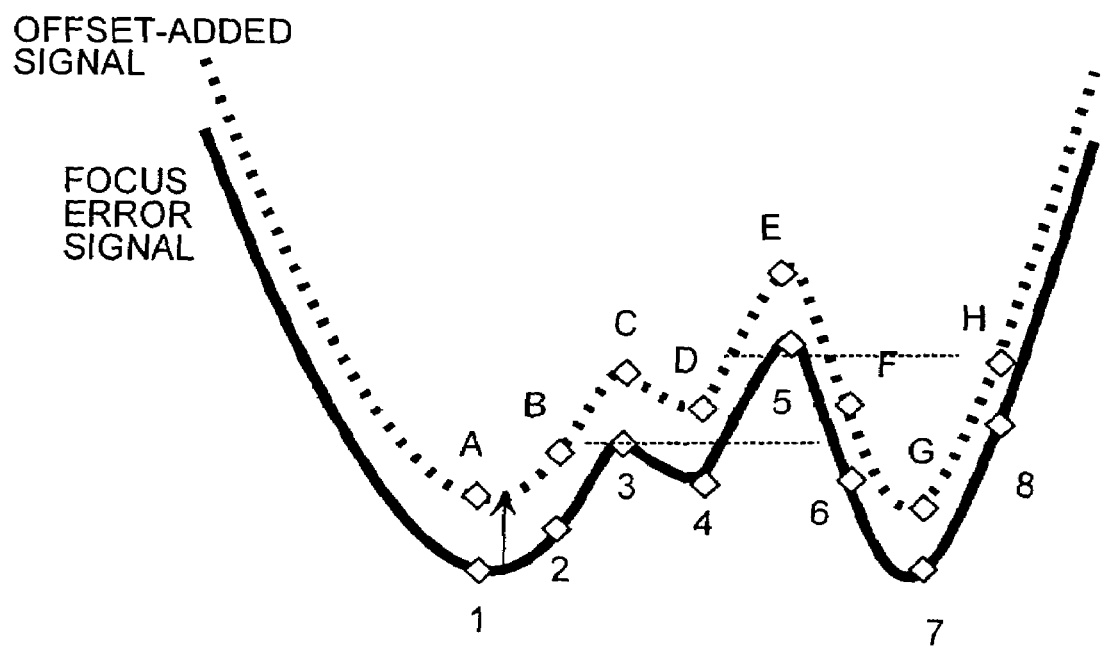
FIG. 12 shows a specific method for detecting a maximum value of a focus error signal by means of the value holding circuit shown in FIG. 1.

FIG. 12 schematically shows how a maximum value is detected by the value holding circuit 25. In FIG. 12, the solid line represents a focus error signal and a dotted line represents a signal obtained by adding an offset value to the focus error signal.

Where no offset value is added to the focus error signal, that is, the offset value is zero, the solid line representing the focus error signal coincides with the dotted line representing the offset-value-added signal. In this case, first, a value of point 1 is held by the value holding circuit 25 as a maximum value. Then, this maximum value is compared with a value of point 2. Since the value of point 2 is larger than the maximum value, the letter is employed as a new maximum value. Then, the new maximum value is compared with a value of point 3. Since the value of point 3 is larger than the maximum value, the latter is employed as a new maximum value. Then, the new maximum value is compared with a value of point 4. Since the maximum value (i.e., the value of point 3) is larger than the value of point 4, the maximum value is not updated; the value of point 3 is finally held as a maximum value of the focus error signal.

Next, a description will be made of a case where an offset signal is added to a focus error signal.

In the case of detecting a maximum value, the offset value is made a positive value. As a result, a signal obtained by adding the offset value-to the original signal (in this case, the focus error signal) has larger values than the original signal. To detect a maximum value, first, a value of point 1 is held by the value holding circuit 25 as a maximum value. Then, the maximum value is compared with a value of point B obtained by adding the offset value to a value of point 2. Since the value of point B is larger than the maximum value, the value of point 2 is employed as a new maximum value. Then, the new maximum value is compared with a value of point C that is obtained by adding the offset value to a value of point 3. Since the value of point C is larger than the maximum value, the value of point 3 is employed as a new maximum value. Then, the new maximum value is compared with a value of point D that is obtained by adding the offset value to a value of point 4. Since the value of point D is larger than the maximum value, the value of point 4 is employed as a new maximum value. Then, the new maximum value is compared with a value of point E that is obtained by adding the offset value to a value of point 5. Since the value of point E is larger than the maximum value, the value of point 5 is employed as a new maximum value. Then, the new maximum value is compared with a value of point F that is obtained by adding the offset value to a value of point 6. Since the value of point F is smaller than the maximum value, the maximum value is not updated; the value of point 5 is finally judged as a maximum value of the focus error signal.

As described above, in the example of FIG. 12, if no offset signal is added to the focus error signal, the value of point 3 is finally judged as a maximum value of the focus error signal. In contrast, in the case where the offset value is added to the focus error signal, among the values of point 1 to point 8 the value of point 5 is judged as a maximum value. Therefore, by using a signal obtained by adding an offset value to an original signal, a maximum value can be detected without being influenced by noise or disturbance whose amplitude is smaller than the offset value.

The microcomputer 13 judges that the objective lens 3 has made a transition from ascent to descent, at a time point when the comparison result signal comes to indicate that the maximum value of the focus error signal has not been updated. As the objective lens 3 continues to ascend, the level of the focus error signal exceeds the threshold level C (23*c*) at time point H. The comparison circuit 22*a* supplies a comparison detection signal to that effect to the microcomputer 13. In response to this comparison detection signal, the microcomputer 13 switches the changeover switch 19*b* to the G-side. The speed of the objective lens 3 is approximately equal to zero when it is focused at a position close to the first recording layer. Therefore, by performing a feedback loop focus control using the focus error signal, the objective lens 3 can be pulled into a position where it is focused on the first recording layer.

FIG. 7 shows a case that the elevation voltage and the lowering voltage are well balanced. In this case, the elevation speed of the objective lens 3 becomes zero when it is focused at a position close to the first layer recording layer, and the objective lens 3 is pulled into a position where it is focused on the first recording layer without making a transition to descent.

Figure 8:
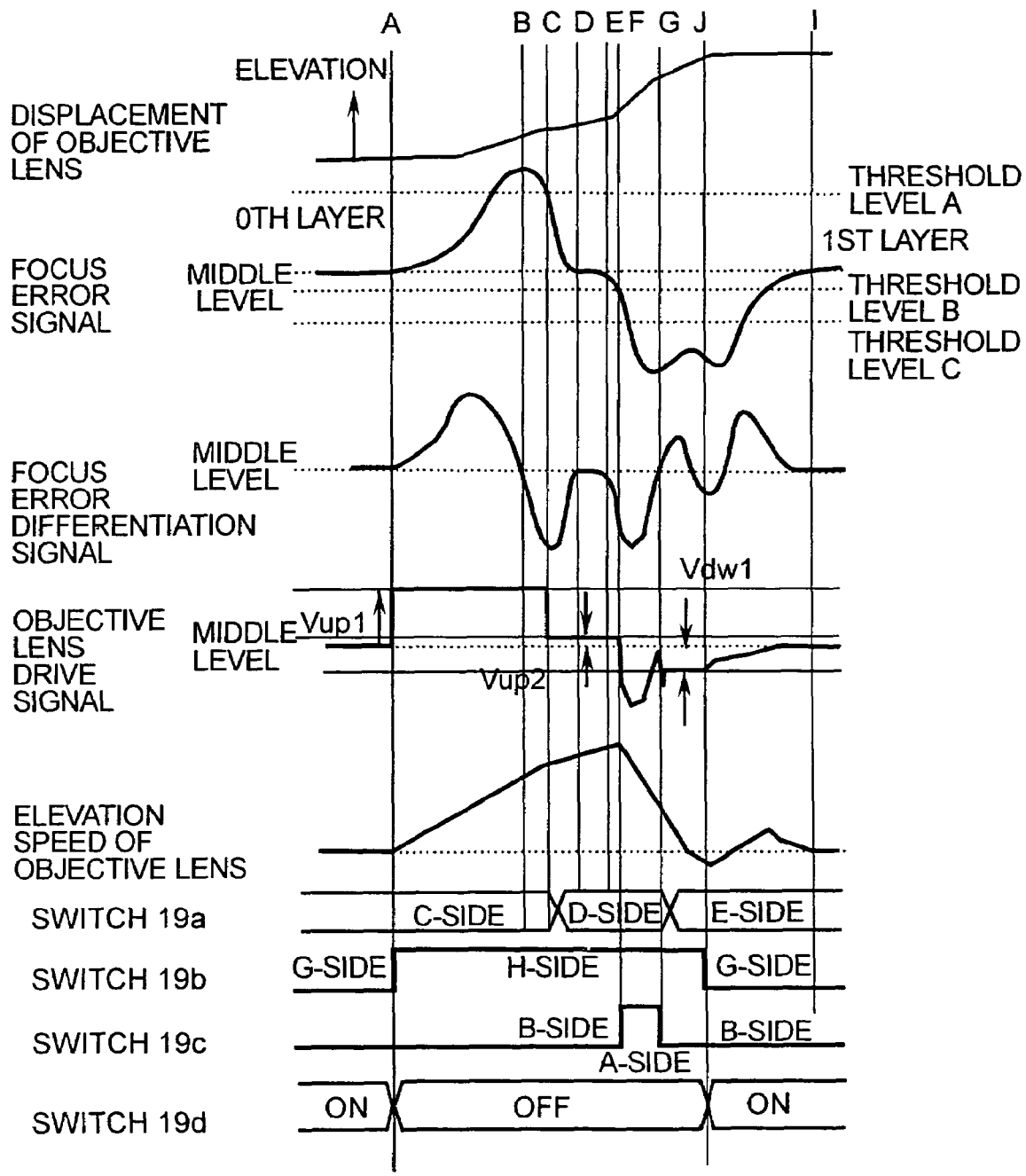
FIG. 8 is a timing chart showing another specific example of how the individual circuits operate in a focus jump from a 0th-layer focus point to a first-layer focus point in the optical disc apparatus of FIG. 1.

FIG. 8 similarly shows a case that the objective lens 3 is focused on the 0th recording layer and it is desired to move the focus position of the objective lens 3 to the first layer recording layer (i.e., it is desired to jump from a focus point corresponding to the lower (0th) recording layer to that corresponding to the upper (first) recording layer), and that the deceleration voltage is too high relative to the acceleration voltage and hence, if no proper measure were taken, the objective lens 3 would start to descend before reaching a position where it is focused on the first recording layer.

Referring to FIG. 8, the controls from time point A to G are the same as described above. That is, the elevation voltage value A (16*a*) is applied first and then the elevation voltage value B (16*b*) is applied. After the focus position has passed through the interlayer region between the 0th recording layer and the first recording layer, a speed control is performed by using a signal obtained by the differentiation circuit 12's differentiating the focus error signal that is supplied from the signal processing circuit 7. The objective lens 3 continues to ascend until time point G. Because of the speed control, the elevation speed becomes zero at a time point close to time point G. The objective lens 3 starts to descend because the lowering voltage value A (17*a*) is applied to the actuator after passage of time point G. Although the focus jump from the 0th-layer focus point to the first-layer focus point is intended, a return to the 0th-layer focus point is started (time point J).

The focus jump would fail if the above operation continued. To avoid such a failure, the operation of returning to the 0th-layer focus point is detected by the above-described maximum value detection by the microcomputer 13. When detecting the returning operation, the microcomputer 13 switches the changeover switch 19*b* to the G-side without waiting for an event that the level of the focus error signal exceeds the threshold level C (23*c*). At this time point, the focus position of the objective lens 3 is a little distant from the first recording layer. However, since the speed of the objective lens 3 is approximately zero, the objective lens 3 is located in such a region that a feedback loop focus control using the focus error signal can be performed successfully and hence the objective lens 3 can be pulled into a position where it is focused on the first recording layer.

Next, referring to FIG. 9, a description will be made of a case that the objective lens 3 is focused on the first recording layer and it is intended to move the focus position of the objective lens 3 to the 0th recording layer (i.e., it is intended to jump from a focus point corresponding to the upper (first) recording layer to that corresponding to the lower (0th) recording layer).

Currently the apparatus is in a steady state. An objective lens 3 drive signal that is output from the focus control circuit 8 in such a state that the first-layer focus point is established is supplied to the on/off switch 19*d*. Since in this steady state the on/off switch 19*d* is closed, the drive signal is supplied to the previous value holding circuit 15 as it is. The previous value holding circuit 15 continues to hold the value held so far and supplies it to the LPF 14 until the value of the received drive signal varies. The LPF 14 has such a frequency characteristic as to reject high-frequency components (noise components) of the objective lens 3 drive signal and not to reject low-frequency components such as a surface vibration component that is caused by rotation of the disc 1 having a warp or the like. As such, the LPF 14 rejects mainly noise components from the drive signal and supplies a resulting signal to the adder 18*a*. In a steady state, the components to the LPF 14 always operate.

To cause a focus jump to a focus point corresponding to the 0th recording layer, the microcomputer 13 sets initial values of a constant lowering voltage value A (17*a*) and a constant lowering voltage value B (17*b*) that are acceleration voltage values necessary for the interlayer movement, a constant elevation voltage value A (16*a*) a threshold level A (23*a*), a threshold level B (23*b*), a threshold value C (23*c*), an offset value 24, and a gain factor 20.

After setting those initial values, the microcomputer 13 switches the changeover switches 19*b* and 19*c* to the H-side and the B-side, respectively, and opens the on/off switch 19*d*. As a result of the switching of the changeover switch 19*b* and the on/off switch 19*d*, the feedback loop by which the objective lens 3 has been controlled so far is made an open loop and the feedback control is stopped. Then, the microcomputer 13 issues, to the changeover switch 19*a*, an instruction to switch to the E-side, whereby the lowering voltage value A (17*a*) is supplied to the adder 18*a*. The adder 18*a* adds the lowering voltage value A (17*a*) to a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied to the pickup 4 via the changeover switch 19*b*. Since the lowering voltage value A (17*a*) is applied to the actuator, the objective lens 3 starts to go down.

Figure 9:
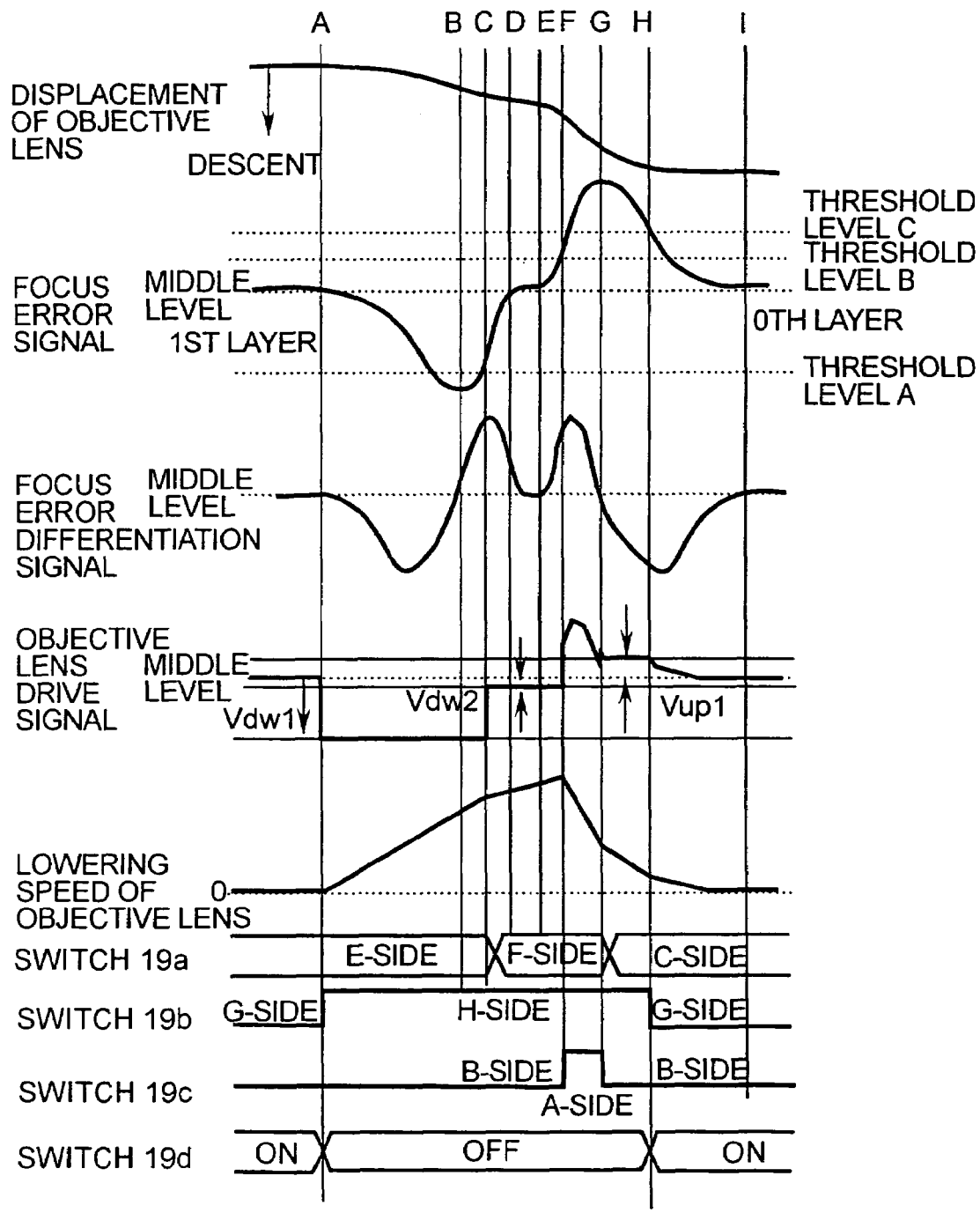
FIG. 9 is a timing chart showing a specific example of how the individual circuits operate in a focus jump from a first-layer focus point to a 0th-layer focus point in the optical disc apparatus of FIG. 1.

In FIG. 9, time point A is a start point of the focus jump. The lowering voltage value A (17*a*; also denoted by "Vdw1" in FIG. 9) is applied, as it is, as an objective lens drive signal, to the actuator for driving the objective lens 3.

A focus error signal that is output from the signal processing circuit 7 is supplied to the differentiation circuit 12. The differentiation circuit 12 differentiates the received focus error signal. The differentiation circuit 12 may be a high-pass filter (HPF) that performs differentiation with respect to time in a prescribed band.

The focus error signal that is output from the signal processing circuit 7 is also supplied to the comparison circuit 22*a*, the adder 18*b*, and the value holding circuit 25.

FIG. 9 shows a focus error signal and a focus error differentiation signal (hereinafter abbreviated as "differentiation signal") that occur when a focus jump from a focus point corresponding to the first recording layer to a focus point corresponding to the 0th recording layer is performed. Those signals will be described below in detail for each of sections that are defined by time points A–I.

When the objective lens 3 goes down after the focus jump was started at time point A, the focus error signal falls gradually from a level close to the middle level until time point B. In this section from time point A to B, the differentiation signal falls gradually from a level close to the middle level, reaches a minimum value, then gradually increases, and finally returns to the middle level (zero) at time point B when the focus error signal has a minimum value. As the objective lens 3 goes down further, at time point D the focus position enters the interlayer region between the first recording layer and the 0th recording layer. The focus error signal increases gradually from the minimum value and reaches the middle level (zero). In the section from time point B to D, the differentiation signal increases from the middle level (zero), reaches a maximum value, then decreases gradually, and finally reaches the middle level (zero) again. In the section from time point D to E that corresponds to the interlayer region, both of the focus error signal and the differentiation signal are at the middle level (zero). As the objective lens 3 goes down further, the focus position enters the 0th layer region and hence the focus error signal rises gradually from a level close to the middle level until time point G. In the section from time point E to G, the difference signal rises gradually from a level close to the middle level, reaches a maximum value, then gradually decreases, and finally reaches the middle level (zero) at time point G when the focus error signal has a maximum value. As the objective lens 3 goes down further, a 0th-layer focus point is established at time point I. The focus error signal gradually decreases from the maximum value and reaches the middle level (zero). In the section from time point G to I, the differentiation signal decreases from the middle level (zero), reaches a minimum value, then increases gradually, and finally reaches the middle level (zero). At time point I when the 0th-layer focus point is established, the focus error signal and the differentiation signal reach the respective middle levels (zero).

By using the differentiation signal, more specifically, by detecting a time point (zero-cross point) when the differentiation signal crosses the middle level (zero), a position of the objective lens 3 corresponding to time point B can be detected easily and reliably. Although time point B can also be detected by monitoring the level of the focus error signal, the detection is not reliable because the amplitude of the focus error signal varies depending on the disc, for example, and hence is not uniform.

The differentiation signal that is output from the differentiation circuit 12 is supplied to the microcomputer 13. The microcomputer 13 detects that the objective lens 3 has passed a position corresponding to time point B by detecting a time point (zero-cross point) when the differentiation signal received reaches the middle level (zero). When detecting, first time, the position corresponding to time point B, the microcomputer 13 issues, to the changeover switch 19*e*, an instruction to switch to the K-side, whereby the threshold level A (23*a*) is supplied to the comparison circuit 22*a*. The comparison circuit 22*a* compares the focus error signal that is supplied from the signal processing circuit 7 with the threshold level A (23*a*) and supplies a comparison result to the microcomputer 13.

As the objective lens 3 goes down further, the level of the focus error signal becomes higher than the threshold level A (23*a*) at time point C, whereupon the comparison circuit 22*a* supplies a comparison detection signal to the microcomputer 13. When receiving the comparison detection signal, the microcomputer 13 switches the changeover switch 19*a* to the F-side, whereby the lowering voltage value B (17*b*) is supplied to the adder 18*a*. The adder 18 adds the lowering voltage value B (17*b*) to a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied to the pickup 4 via the changeover switch 19*b*. Since the lowering voltage value B (17*b*) is applied to the actuator, the objective lens 3 continues to go down.

As shown in FIG. 9, after the lowering voltage value switching time point C, the lowering voltage value B (17*b*; also denoted by "Vdw2") is supplied, as it is, to the actuator for driving the objective lens 3. The lowering voltage value B (17*b*) is set smaller than the lowering voltage value A (17*a*). Therefore, the lowering speed of the objective lens 3 is lower than when the lowering voltage value A (17*a*) was applied to the actuator.

After time point C has been passed, the microcomputer 13 issues, to the changeover switch 19*e*, an instruction to switch to the L-side. The change over switch 19*e* supplies the threshold level B (23*b*) to the signal level comparison circuit 22*a*. The signal level comparison circuit 22*a* compares the level of the focus error signal that is supplied from the signal processing circuit 7 with the threshold level B (23*b*). When the level of the focus error signal becomes higher than the threshold level B (23*b*) (time point F in FIG. 9), the signal level comparison circuit 22*a* supplies a signal to that effect to the microcomputer 13.

When detecting that time point F has been passed, to apply a voltage value for decelerating the objective lens 3 that has continued to go down, the microcomputer 13 issues, to the changeover switch 19*c*, an instruction to switch to the A-side. At this time, the focus error signal that is output from the signal processing circuit 7 is supplied to the differentiation circuit 12. A differentiated version of the focus error signal generated by the differentiation circuit 12 is supplied to the multiplier 21. The multiplier 21 supplies the changeover switch 19*c* with a result obtained by multiplying the differentiation signal by the gain factor 20. Since the changeover switch C 19*c* is switched to the A-side, the multiplication result is supplied to the changeover switch 19*b* as it is. The signal obtained by multiplying the differentiation signal by the gain factor 20 is supplied, as a deceleration signal, to the actuator via the changeover switch 19*b*.

In the section from time point F to G, the focus error signal reflects the displacement of the objective lens 3 (it increases monotonously). Since in general speed is obtained by differentiating displacement with respect to time, a signal obtained by differentiating the focus error signal represents the movement speed of the objective lens 3. For example, if a high lowering voltage has been applied to the actuator and hence a lowering speed of the objective lens 3 when switching is made to the deceleration voltage is high, the focus error signal rises steeply from time point F to G. Therefore, a signal obtained by differentiating such a focus error signal has a large value, that is, the deceleration voltage has a large value, which means that the force of decreasing the lowering speed of the objective lens 3 is strong. Conversely, if a low lowering voltage has been applied to the actuator and hence a lowering speed of the objective lens 3 when switching is made to the deceleration voltage is low, the focus error signal rises gently from time point F to G. Therefore, a signal obtained by differentiating such a focus error signal has a small value, that is, the deceleration voltage has a small value, which means that the force of decreasing the lowering speed of the objective lens 3 is weak.

A deceleration voltage value corresponding to a lowering speed of the objective lens 3 can be obtained and the lowering speed of the objective lens 3 can be decreased by using a signal obtained by differentiating the focus error signal from time F to G in the above-described manner.

The gain factor 20 is used for adjusting the amplitude of the deceleration voltage that is obtained by differentiating the focus error signal. The objective lens 3 continues to go down even after the application of the deceleration voltage to the actuator. After time point F has been passed, the microcomputer 13 monitors the focus error signal and detects its maximum value. The above-described method for detecting a maximum value is used here.

That is, the focus error signal that is output from the signal processing circuit 7 is supplied to the adder 18*b* and the value holding circuit 25. The adder 18*b* adds together the offset value 24 and the focus error signal that is supplied from the signal processing circuit 7, and supplies a resulting signal to the comparison circuit 22*b*. According to an instruction from the microcomputer 13, the comparison circuit 22*b* compares the output of the adder 18*b* with the output of the value holding circuit 25. If the output value of the adder 18*b* is larger than the output value of the value holding circuit 25, the comparison circuit 22*b* supplies a comparison result signal to the value holding circuit 25. In response to the comparison result signal, the value holding circuit 25 updates the value that has been held so far to the value of the focus error signal. In this manner, the maximum value of values, input so far, of the focus error signal is always held by the value holding circuit 25.

The microcomputer 13 judges that time point G has been passed, at a time point when the comparison result signal comes to indicate that the maximum value of the focus error signal has not been updated. When detecting the passage of time point G, to stop stably the objective lens 3 that is about to make a transition from descent to ascent and to establish a 0th-layer focus point (time point I in FIG. 9), the microcomputer 13 issues, to the changeover switches 19*a* and 19*c*, instructions to switch to the C-side and the B-side, respectively. Switched to the C-side, the changeover switch 19*a* outputs the elevation voltage value A (16*a*). The adder 18*a* adds together the elevation voltage value A (16*a*) and a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied, via the changeover switch 19*b*, to the pickup 4, where it is applied to the actuator for driving the objective lens 3. Because of the application of the elevation voltage value A (16*a*) to the actuator, the elevation speed of the objective lens 3 is decreased and the objective lens 3 stops descending.

After judging that time point G has been passed, the microcomputer 13 issues, to the changeover switch 19*e*, to switch to the M-side, whereby the threshold level C (23*c*) is supplied to the comparison circuit 22*a*. The comparison circuit 22*a* compares the focus error signal that is supplied from the signal processing circuit 7 with the threshold level C (23*c*)., and supplies a comparison result to the microcomputer 13.

Further, after judging that time point G has been passed, the microcomputer 13 monitors the focus error signal and detects its maximum value. The above-described method for detecting a maximum value is used here.

That is, the focus error signal that is output from the signal processing circuit 7 is supplied to the adder 18*b* and the value holding circuit 25. The adder 18*b* adds together the offset value 24 and the focus error signal that is supplied from the signal processing circuit 7, and supplies a resulting signal to the comparison circuit 22*b*. The offset value is used for preventing erroneous detection of a minimum value when the focus error signal is influenced by noise or the like. According to an instruction from the microcomputer 13, the comparison circuit 22b compares the offset-value-added output of the adder 18b with the output of the value holding circuit 25. If the output value of the adder 18b is smaller than the output value of the value holding circuit 25, the comparison circuit 22b supplies a comparison result signal to the value holding circuit 25. In response to the comparison result signal, the value holding circuit 25 updates the value that has been held so far to the value of the focus error signal.

The microcomputer 13 judges that the objective lens 3 has made a transition from descent to ascent, at a time point when the comparison result signal comes to indicate that the minimum value of the focus error signal has not been updated. As the objective lens 3 continues to descend, the level of the focus error signal becomes lower than the threshold level C (23c) at time point H. The comparison circuit 22a supplies a comparison detection signal to that effect to the microcomputer 13. In response to this comparison detection signal, the microcomputer 13 switches the changeover switch 19b to the G-side. The speed of the objective lens 3 is approximately equal to zero when it is focused at a position close to the 0th recording layer. Therefore, by performing a feedback loop focus control using the focus error signal, the objective lens 3 can be pulled into a position where it is focused on the 0th recording layer.

FIG. 9 shows a case that the lowering voltage and the elevation voltage are well balanced. In this case, the lowering speed of the objective lens 3 becomes zero when it is focused at a position close to the 0th layer recording layer, and the objective lens 3 is pulled into a position where it is focused on the 0th recording layer without making a transition to ascent.

Figure 10:
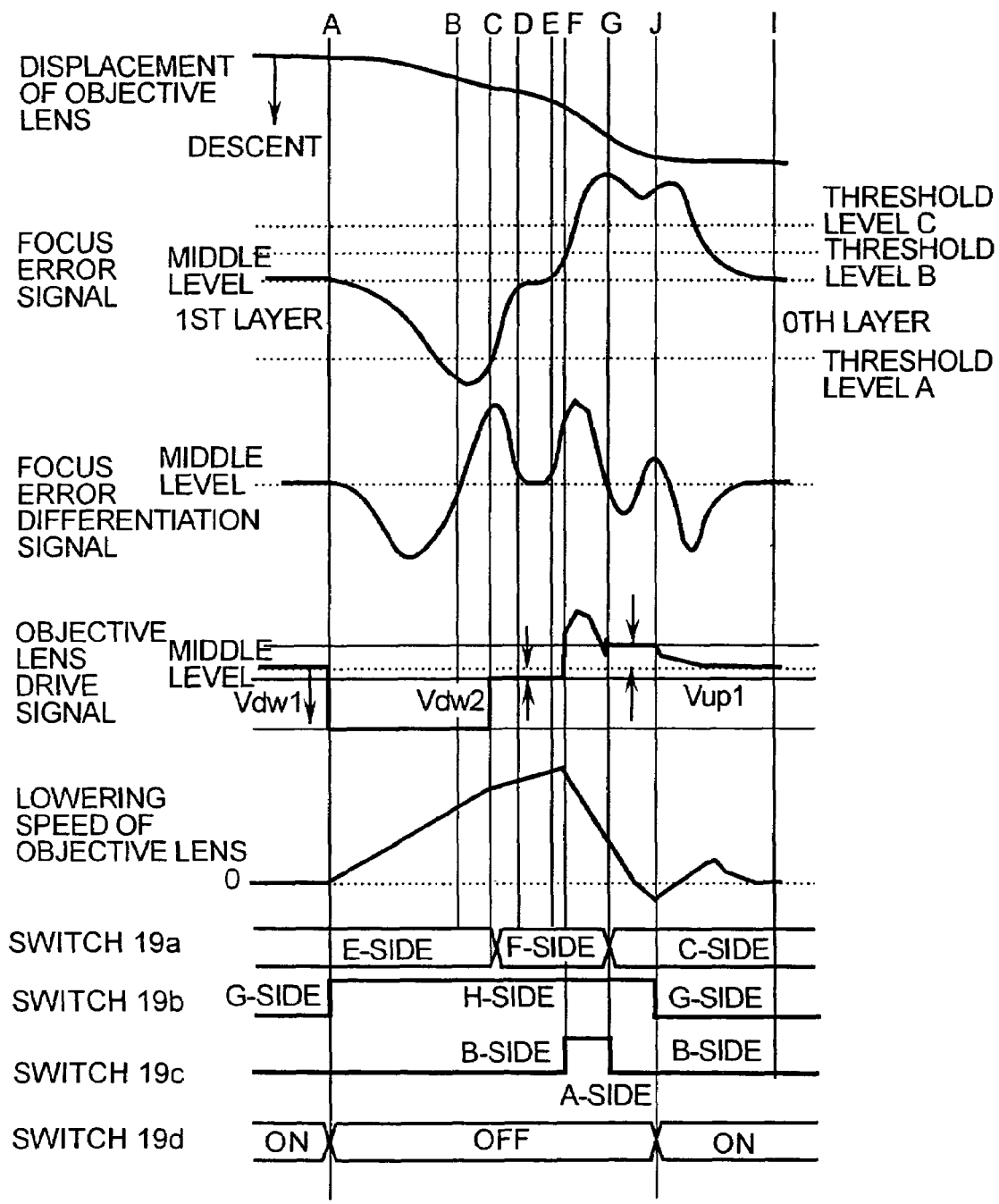
FIG. 10 is a timing chart showing another specific example of how the individual circuits operate in a focus jump from a first-layer focus point to a 0th-layer focus point in the optical disc apparatus of FIG. 1.

FIG. 10 similarly shows a case that the objective lens 3 is focused on the first recording layer and it is desired to move the focus position of the objective lens 3 to the 0th layer recording layer (i.e., it is desired to jump from a focus point corresponding to the upper (first) recording layer to that corresponding to the lower (0th) recording layer), and that the deceleration voltage is too high relative to the acceleration voltage and hence, if no proper measure were taken, the objective lens 3 would start to ascend before reaching a position where it is focused on the 0th recording layer.

Referring to FIG. 10, the controls from time point A to G are the same as described above. That is, the lowering voltage value A (17a) is applied first and then the lowering voltage value B (17b) is applied. After the focus position has passed through the interlayer region between the first recording layer and the 0th recording layer, a speed control is performed by using a signal obtained by the differentiation circuit 12's differentiating the focus error signal that is supplied from the signal processing circuit 7. The objective lens 3 continues to descend until time point G. Because of the speed control, the lowering speed becomes zero at a time point close to time point G. The objective lens 3 starts to ascend because the elevation voltage value A (16a) is applied to the actuator after passage of time point G (time point J). Although the focus jump from the first-layer focus point to the 0th-layer focus point is intended, a return to the first-layer focus point is started.

The focus jump would fail if the above operation continued. To avoid such a failure, the operation of returning to the first-layer focus point is detected by the above-described minimum value detection by the microcomputer 13. When detecting the returning operation, the microcomputer 13 switches the changeover switch 19b to the G-side without waiting for an event that the level of the focus error signal becomes lower than the threshold level C (23c). At this time point, the focus position of the objective lens 3 is a little distant from the 0th recording layer. However, since the speed of the objective lens 3 is approximately zero, the objective lens 3 is located in such a region that a feedback loop focus control using the focus error signal can be performed successfully and hence the objective lens 3 can be pulled into a position where it is focused on the 0th recording layer.

As described above, the way a maximum value and a minimum value occur in the focus error signal as the objective lens 3 goes up and down may be entirely opposite to the above depending on how the outputs of the photodetector 54 are connected to the error amplifier 55 (see FIG. 5). Where a maximum value and a minimum value occur in the opposite manner, naturally it is proper to think about the operation of the apparatus bearing in mind that a maximum value and a minimum value occur in the opposite manner for the above reason.

Although in this embodiment the number of positions where the voltage that is applied to the actuator is controlled by using the focus error signal is three, a finer control may be performed by employing more positions.

Figure 13:
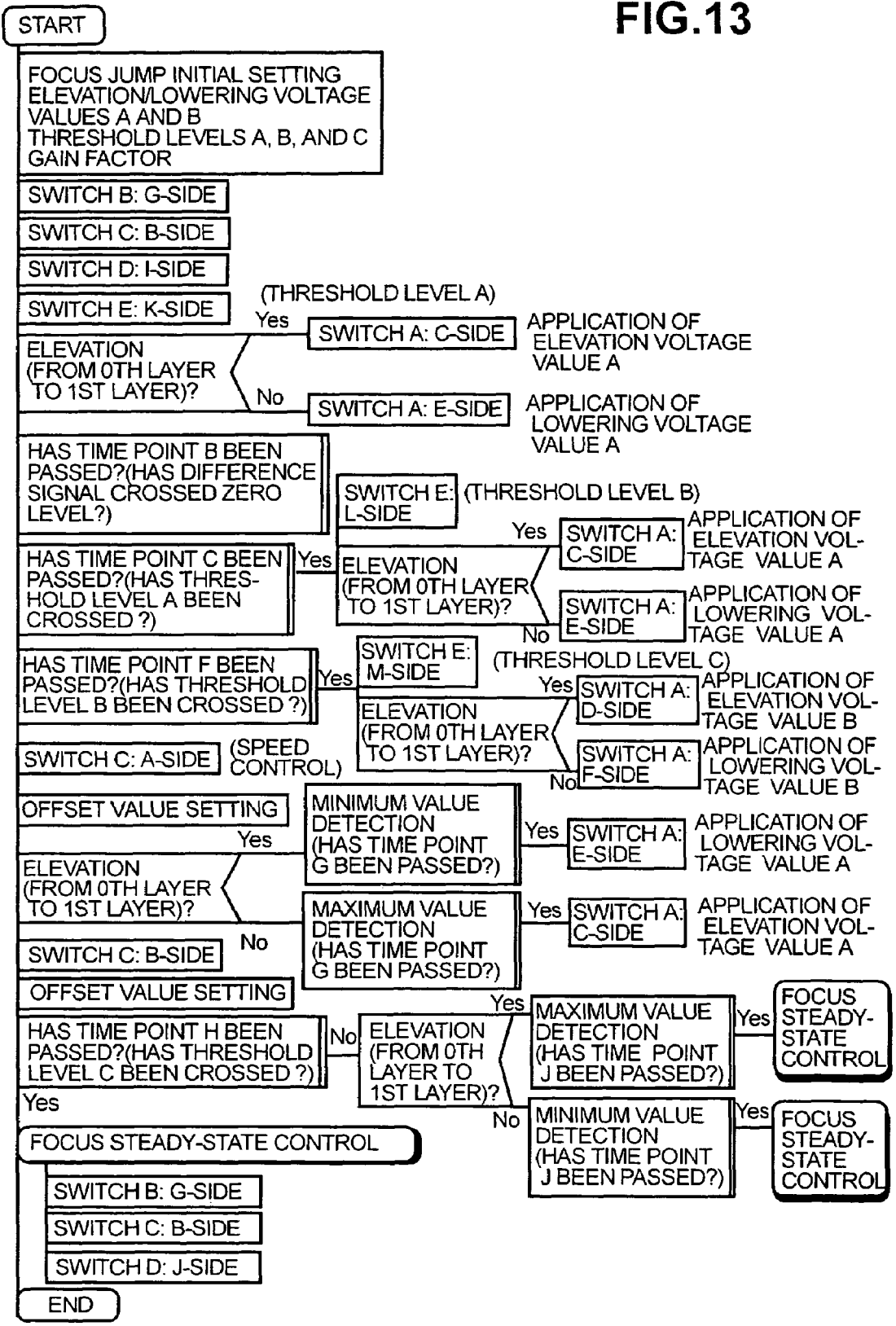
FIG. 13 is a flowchart showing a specific example of an algorithm of focus jump controls that are performed by a microcomputer in the optical disc apparatus of FIG. 1.

In this embodiment, the controls during a focus jump are performed by the microcomputer 13. FIG. 13 is a PAD diagram showing an algorithm of those controls. Based on this algorithm, the microcomputer 13 can control a focus jump in a stable manner.

As described above, this embodiment can provide an optical disc apparatus that can perform a focus jump in a stable manner irrespective of influence of surface vibration, a variation in interlayer distance, noise that is added to the focus error signal, a variation in the sensitivity of the actuator for driving the objective lens 3, disturbance that is introduced during a focus jump, and other factors by detecting the movement speed of the objective lens 3 during a focus jump and variably controlling the deceleration voltage so that the degree of deceleration is made constant, and that can perform a focus jump in a reliable manner by detecting an event that the objective lens 3 starts to move in the direction opposite to the direction of an intended focus jump by monitoring the focus error signal during the focus jump and thereby preventing the objective lens 3 from returning to a recording layer from which the focus jump was started.

Figure 14:
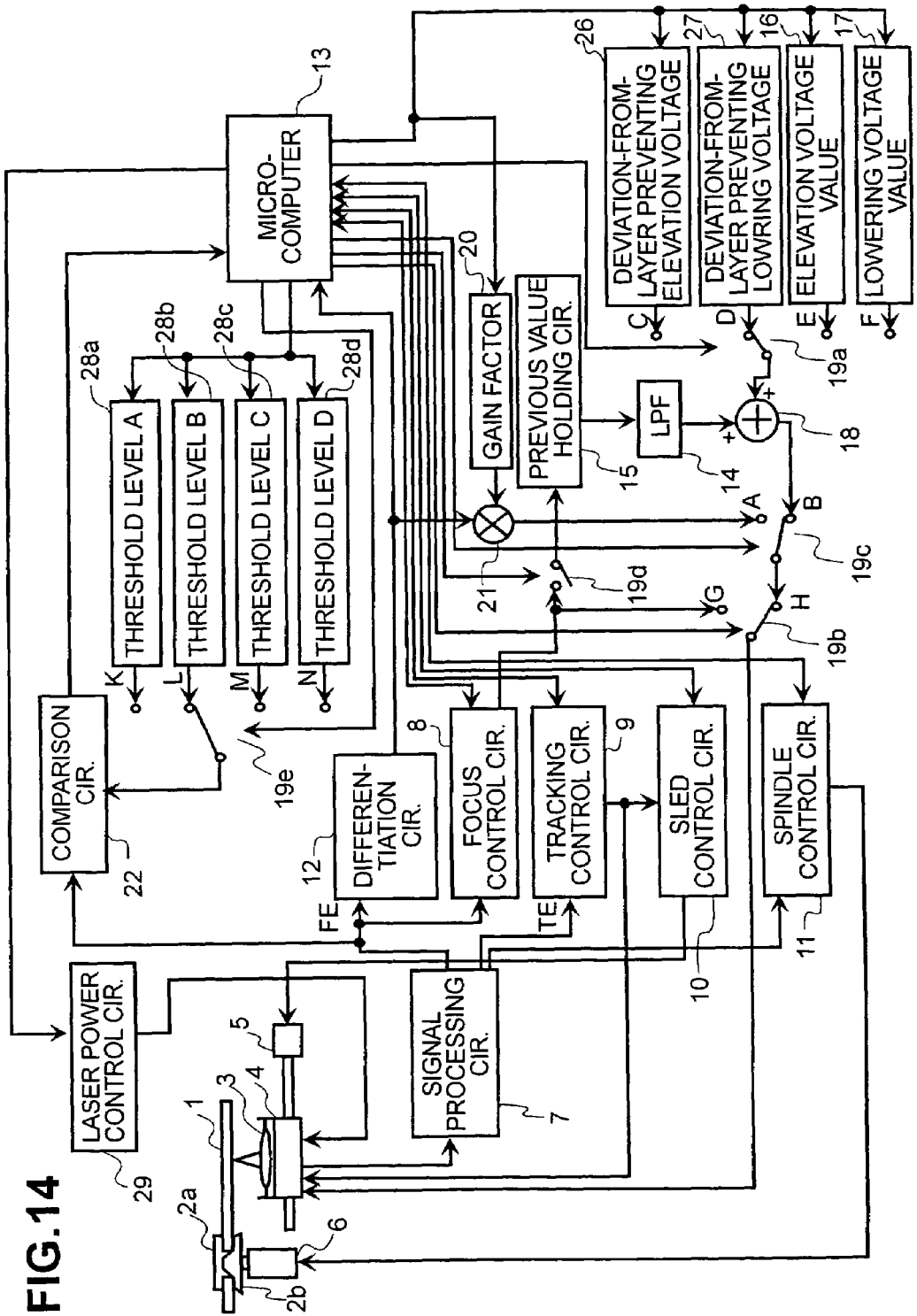
FIG. 14 is a block diagram showing an optical disc apparatus and a focus jump method according to another embodiment of the invention.

FIG. 14 is a block diagram showing an optical disc apparatus and a focus jump method according to another embodiment of the invention. In FIG. 14, reference numeral 16 denotes an elevation voltage value; 17, a lowering voltage value; 26, a deviation-from-layer preventing elevation voltage; 27, a deviation-from-layer preventing lowering voltage; 28a, a threshold level A; 28b, a threshold level B; 28c, a threshold level C; 28d, a threshold level D; and 29, a laser power control circuit. The circuits in FIG. 14 having the corresponding circuits in FIG. 1 are given the same symbols as the latter.

As shown in FIG. 14, a data-recordable disc 1 that has been set on the turn table 2b is fixed to the turn table 2b by the clamper 2a. The disc 1 is rotated as the spindle motor 6 is rotated. To read out information on the disc 1, the microcomputer 13 controls the laser power control circuit 29 and thereby causes a laser to emit light. Further, the microcomputer 13 controls the laser power control circuit 29 in accordance with whether to record or reproduce data on or from the disc 1.

For example, in the case of a DVD-RAM that is a data-recordable, phase-change disc, information is recorded, erased, and reproduced by utilizing a phase change phenomenon that an alloy film as a recording film is rendered in a crystal state or an amorphous state by applying laser light to it and controlling heat generated there.

In recording, high-power laser light is applied to the alloy film, as a result of which parts of the alloy film are heated to a temperature higher than the melting point and are melted. If the melted portions are cooled quickly, they become amorphous. Such an amorphous state is a data-recorded state. On the other hand, in erasure, laser light whose power is lower than in recording is applied to recorded portions, that is, amorphous portions, which are thereby heated to a temperature higher than the crystallization temperature. Those portions are cooled and thereby crystallized. The change from the amorphous state to the crystal state means data erasure. In general, the crystallization temperature of an alloy film is lower than its melting temperature. Therefore, high-power laser light whose power is lower than the power of high-power laser light that is used in recording can be used in erasure. Information can be recorded and erased by controlling the laser power in this manner.

In reproduction, low-power laser light whose power is approximately 1/20 to 1/30 of the power of high-power laser light used in recording is applied to the alloy film. Data is reproduced by utilizing the fact that crystallized portions and amorphous portions are different in light reflectance. That is, in an apparatus capable of recording and reproducing data on and from a recordable disc, data can be recorded on, erased from, and reproduced from a disc by using a single kind of laser light in such a manner that the power of laser light applied to the disc is controlled in three levels that correspond to recording, erasure, and reproduction, respectively.

In phase-change recordable discs of the above kind, it is a common procedure to record and reproduce data by controlling the laser power.

When instructed by the microcomputer 13 to employ a high laser power for recording or low laser power for reproduction, the laser power control circuit 29 supplies an emission control signal to the semiconductor laser 52 that is incorporated in the pickup 4.

The configuration and the operation of the semiconductor laser 52 and the optical system of the optical pickup 4 and those, for focus error signal detection, of the signal processing circuit 7 are the same as described previously with reference to FIGS. 5 and 6.

A focus error signal generated by the error amplifier 55 (see FIG. 5) is supplied to the focus control circuit 8 (see FIG. 14), which generates, by using a delay compensator, a lead compensator, etc., and outputs a focus control signal for an actuator (not shown) for moving the objective lens 3, to enable a feedback control in the vicinity of the zero-cross point of an S-shaped curve of the focus error signal. The output signal is supplied to the on/off switch 19d. In a steady state, the on/off switch 19d is closed according to an instruction from the microcomputer 13 and thereby supplies the focus control signal to the pickup 4 as a drive signal. The vertical position of the objective lens 3 with respect to the disc 1 is controlled according to this focus control signal and a feedback loop focus control is realized, whereby the disc 1 always stays at a focus position.

On the other hand, a tracking error signal (TE signal) generated by the signal processing circuit 7 is supplied to the tracking error control circuit 9, which generates, by using a delay compensator, a lead compensator, etc., to enable a feedback control, a drive signal for moving the objective lens 3 in the horizontal direction (hereinafter referred to as "tracking direction") with respect to the disc 1. This drive signal is supplied to the pickup 4. The position of the objective lens 3 is controlled in the tracking direction according to the drive signal that is supplied to the inside of the pickup 4, and a feedback loop tracking control is thereby realized. The beam spot is always located on pits that are formed in a recording layer of the disc 1. The drive signal that is output from the tracking control circuit 9 is also supplied to the sled control circuit 10, which generates, by using a delay compensator, a lead compensator, etc., to enable a feedback control, a drive signal for controlling the sled motor 5 in accordance with the deviation of the objective lens 3 in the tracking direction. The sled motor 5 is driven according to the drive signal received, whereby the pickup 4 itself is moved.

Further, the signal processing circuit 7 supplies the spindle control circuit 11 with rotation cycle information that is read from the disc 1. The spindle control circuit 11 generates by using a delay compensator, a lead compensator, etc., a signal for driving the spindle motor 6 based on the received rotation cycle information, and supplies it to the spindle motor 6. At this time, according to an instruction from the microprocessor 13, the laser power control circuit 29 controls the semiconductor laser 52 so that it emits low-power laser light during data reproduction and high-power laser light for data recording or erasure during data recording.

Figure 15:
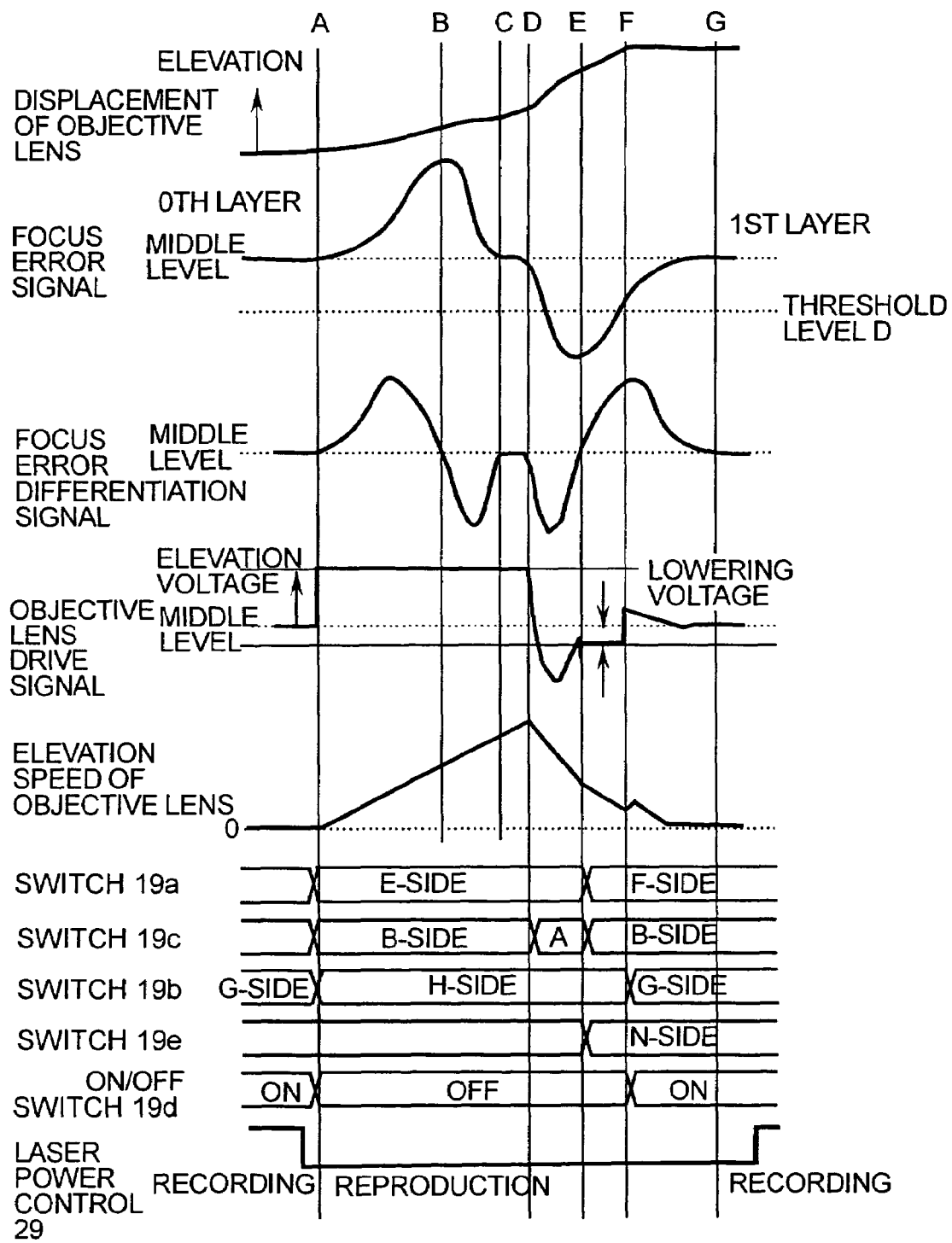
FIG. 15 is a timing chart showing a specific example of how individual circuits operate in a focus jump from a 0th-layer focus point to a first-layer focus point in the optical disc apparatus of FIG. 14.

In a steady state, recording or reproduction is performed while the focus, tracking, spindle, and sled (the base of the pickup 4) controls are performed in the above-described manners with the objective lens 3 focused on a recording layer.

Where the disc 1 is a recordable disc of the above kind (e.g., a DVD-RAM) having two recording layers on one side, there may occur a case that it is necessary to switch from a focus point corresponding to a recording layer on which recording is being performed to another focus point corresponding to the other recording layer. Referring to FIG. 15, a description will be made below of an exemplary case that the objective lens 3 is located at such a position as to be focused on the 0th recording layer and data is being recorded on the 0th recording layer, and that it is desired to move the focus position of the objective lens 3 to the first recording layer because data should be recorded on a portion of the first recording layer next (i.e., it is desired to jump from a focus point corresponding to the lower (0th) recording layer on which data is being recorded to a focus point corresponding to the upper (first) recording layer).

FIG. 15 shows a displacement variation of the objective lens 3, a focus error signal, a signal (hereinafter referred to as "differentiation signal") obtained by differentiating the focus error signal, a focus drive signal for driving the objective lens 3, control signals for the respective switches, and a laser power control signal. The vertical axis represents the magnitudes of the displacement and the signals, and the horizontal axis represents time.

First, in a steady state, a focus control signal that is output from the focus control circuit 8 being in a state that a focus point corresponding to the 0th recording layer is established is supplied to the on/off switch 19d. Since the on/off switch 19d is in this steady state, the focus control signal is supplied to the previous value holding circuit 15 as it is. The previous value holding circuit 15 continues to hold a value that has been held so far and supplies it to the LPF 14 until the value of the focus control signal changes. The LPF 14 has such a frequency characteristic as to reject high-frequency components (noise components) of the signal for driving the objective lens 3 in the focusing direction and not to reject low-frequency components such as a surface vibration component that is caused by rotation of the disc 1 having a warp or the like. As such, the LPF 14 rejects mainly noise components from the drive signal and supplies a resulting signal to the adder 18. In a steady state, the components to the LPF 14 always operate. Since the feedback loop is now closed, the control of the focus system follows surface vibration and the focus control signal also waves according to the surface vibration.

To cause a focus jump to a focus point corresponding to the first recording layer while recording data on the 0th recording layer, the microcomputer 13 sets initial values of a constant elevation voltage value 16 that is an acceleration voltage value necessary for the interlayer movement, a constant lowering voltage value 17 that is a deceleration voltage value necessary to decelerate and stop, after acceleration, the objective lens 3 at a position corresponding to a first-layer focus point, a deviation-from-layer preventing lowering voltage 27 that is a deceleration voltage value necessary to prevent the focus position of the objective lens 3 from going past and deviating from the target first recording layer after the focus jump, a deviation-from-layer preventing elevation voltage 26 that is an acceleration voltage value necessary to prevent the objective lens 3 from returning to the 0th recording layer from which the focus jump starts, a threshold level A (28*a*), a threshold level B (28*b*), a threshold value C (28*c*), a threshold value D (28*d*), and a gain factor 20. After setting those initial values and before starting the focus jump, the microcomputer 13 controls the laser power control circuit 29 so that the semiconductor laser 52, which has so far emitted high-power laser light for recording, emits low-power laser light for reproduction. Changing the power of the semiconductor laser 52 to the low power for reproduction prevents an event that recorded data of another recording layer or an adjacent track is erased or rewritten erroneously during the focus jump. After the power of the semiconductor laser 52 has been changed to the low power for reproduction, the focus jump is performed in the following manner.

First, the microcomputer 13 switches the changeover switches 19*b* and 19*c* to the H-side and the B-side, respectively, and opens the on/off switch 19*d*. As a result of the switching of the changeover switch 19*b* and the on/off switch 19*d*, the feedback loop by which the objective lens 3 has been controlled so far is made an open loop and the feedback control is stopped.

Then, the microcomputer 13 issues, to the changeover switch 19*a*, an instruction to switch to the E-side, whereby the elevation voltage value 16 is supplied to the adder 18. The adder 18 adds the elevation voltage value 16 to a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied to the pickup 4 via the changeover switch 19*b*. Since the elevation voltage value 16 is applied to the actuator, the objective lens 3 starts to go up.

Referring to FIG. 15, the operation will be described below in detail for each of sections that are defined by time points A–G.

When the objective lens 3 goes up after the focus jump was started at time point A, the focus error signal rises gradually from a level close to the middle level until time point B. In this section from time point A to B, the differentiation signal of the focus error signal rises gradually from a level close to the middle level, reaches a maximum value, then gradually decreases, and finally returns to the middle level (zero) at time point B when the focus error signal has a maximum value. As the objective lens 3 goes up further, at time point C the focus position enters the interlayer region between the 0th recording layer and the first recording layer. The focus error signal decreases gradually from the maximum value and reaches the middle level (zero). In the section from time point B to C, the differentiation signal decreases from the middle level (zero), reaches a minimum value, then increases gradually, and finally reaches the middle level (zero) again. In the section from time point C to D that corresponds to the interlayer region, both of the focus error signal and the differentiation signal are at the middle level (zero). As the objective lens 3 goes up further, the focus position enters the first layer region and hence the focus error signal falls gradually from a level close to the middle level until time point E. In the section from time point D to E, the difference signal falls gradually from a level close to the middle level, reaches a minimum value, then gradually increases, and finally reaches the middle level (zero) at time point E when the focus error signal has a minimum value. As the objective lens 3 goes up further, a first-layer focus point is established at time point G. The focus error signal gradually increases from the minimum value and reaches the middle level (zero). In the section from time point E to G, the differentiation signal increases from the middle level (zero), reaches a maximum value, then decreases gradually, and finally reaches the middle level (zero). At time point G when the first-layer focus point is established, the focus error signal and the differentiation signal reach the respective middle levels (zero).

By using the differentiation signal, more specifically, by detecting a time point (zero-cross point) when the differentiation signal crosses the middle level (zero), a position of the objective lens 3 corresponding to time point B can be detected easily and reliably. Although time point B can also be detected by monitoring the level of the focus error signal, the detection is not reliable because the amplitude of the focus error signal varies depending on the disc, for example, and hence is not uniform.

Therefore, the differentiation signal that is output from the differentiation circuit 12 is supplied to the microcomputer 13. The microcomputer 13 detects that the objective lens 3 has passed a position corresponding to time point B by detecting a time point (zero-cross point) when the differentiation signal received reaches the middle level (zero).

When detecting the passage of time point B first time, next the microcomputer 13 detects a zero-cross point (time point C) of the focus error signal. As the objective lens 3 goes up further, it passes the end position, corresponding to time point D, of the interlayer region between the 0th recording layer and the first recording layer. When detecting time point D by monitoring the level of the focus error signal, to apply a voltage value for decelerating the ascending objective lens 3 to the actuator, the microcomputer 13 issues, to the changeover switch 19*c*, an instruction to switch to the A-side. As described above, the focus error signal that is output from the signal processing circuit 7 is supplied to the differentiation circuit 12, which generates a differentiation signal and supplies it to the multiplier 21. The multiplier 21 multiplies the received differentiation signal by the gain factor 20 and supplies a multiplication result to the changeover switch 19c. Since at this time the changeover switches 19b and 19c are switched to the H-side and the A-side, respectively, the multiplication signal obtained by multiplying the differentiation signal by the gain factor 20 is supplied to the actuator as a deceleration voltage via the changeover switches 19b and 19c.

In the section from time point D to E, the focus error signal reflects the displacement of the objective lens 3 (it decreases monotonously). Since in general speed is obtained by differentiating displacement with respect to time, the signal obtained by differentiating the focus error signal represents the movement speed of the objective lens 3. For example, if a high elevation voltage has been applied to the actuator and hence an elevation speed of the objective lens 3 when switching is made to the deceleration voltage is high, the focus error signal falls steeply from time point D to E. Therefore, a signal obtained by differentiating such a focus error signal has a large value, that is, the deceleration voltage has a large value, which means that the force of decreasing the elevation speed of the objective lens 3 is strong. Conversely, if a low elevation voltage has been applied to the actuator and hence an elevation speed of the objective lens 3 when switching is made to the deceleration voltage is low, the focus error signal falls gently from time point D to E. Therefore, a signal obtained by differentiating such a focus error signal has a small value, that is, the deceleration voltage has a small value, which means that the force of decreasing the elevation speed of the objective lens 3 is weak.

A deceleration voltage value corresponding to an elevation speed of the objective lens 3 can be obtained and the elevation speed of the objective lens 3 can be decreased by using a signal obtained by differentiating the focus error signal from time D to E in the above-described manner. The gain factor 20 is used for adjusting the amplitude of the deceleration voltage that is obtained by differentiating the focus error signal.

The objective lens 3 continues to go up owing to the acceleration that was given by the elevation voltage 16 even after the application of the deceleration voltage to the actuator.

After the application of the deceleration voltage to the actuator, the microcomputer 13 judges that time point E has been passed by detecting a time point (zero-cross point) when the differentiation signal that is supplied from the differentiation circuit 12 reaches the middle level (zero) again. When detecting the passage of time point E, to stop stably the objective lens 3 that is about to make a transition from ascent to descent and to establish a first-layer focus point (time point G in FIG. 15), the microcomputer 13 issues, to the changeover switches 19a and 19c, instructions to switch to the F-side and the B-side, respectively. Switched to the F-side, the changeover switch 19a outputs the lowering voltage value 17. The adder 18 adds together the lowering voltage value 17 and a signal that is free of high-frequency noise components (rejected by the LPF 14), and supplies a resulting addition signal to the changeover switch 19c. Since the changeover switch 19c is switched to the B-side, the addition signal is supplied from the changeover switch 19c to the changeover switch 19b as it is. Since the changeover switch 19b is switched to the H-side, the addition signal is supplied, via the changeover switch 19b, to the pickup 4, where it is applied to the actuator for driving the objective lens 3. Because of the application of the lowering voltage value 17 to the actuator, the elevation speed of the objective lens 3 is decreased and the objective lens 3 stops ascending.

After the objective lens 3 has passed the position corresponding to time point E, the microcomputer 13 issues, to the changeover switch 19e, to switch to the N-side, whereby the threshold level D (28d) is supplied to the comparison circuit 22. The comparison circuit 22 compares the focus error signal threshold level D (28d), and supplies a comparison result to the microcomputer 13. As the objective lens 3 continues to ascend, the level of the focus error signal exceeds the threshold level D (28d) at time point F. The comparison circuit 22 supplies a comparison detection signal to that effect to the microcomputer 13. In response to this comparison detection signal, the microcomputer 13 switches the changeover switch 19b to the G-side. The speed of the objective lens 3 is approximately equal to zero when it is focused at a position close to the first recording layer. Therefore, a feedback loop focus control using the focus error signal is started, whereby the objective lens 3 can be pulled into a position where it is focused on the first recording layer.

FIG. 15 shows a case that the elevation voltage and the lowering voltage are well balanced. In this case, the elevation speed of the objective lens 3 becomes zero when it is focused at a position close to the first layer recording layer, and the objective lens 3 is pulled into a position where it is focused on the first recording layer without making a transition to descent.

After the objective lens 3 is pulled into the position where it is focused on the first recording layer, the current position of the objective lens 3 is detected based on an ID or the like and the objective lens 3 is moved in the direction (tracking direction) parallel with the disc 1 to a target position where recording on the first recording layer should be started. After the objective lens 3 is moved to the target position, the microcomputer 13 controls the laser power control circuit 29 so that the semiconductor laser 52 (see FIG. 5), which has so far emitted low-power laser light for reproduction, emits high-power laser light for recording. This makes it possible to record data on an intended portion of the first recording layer.

Figure 16:
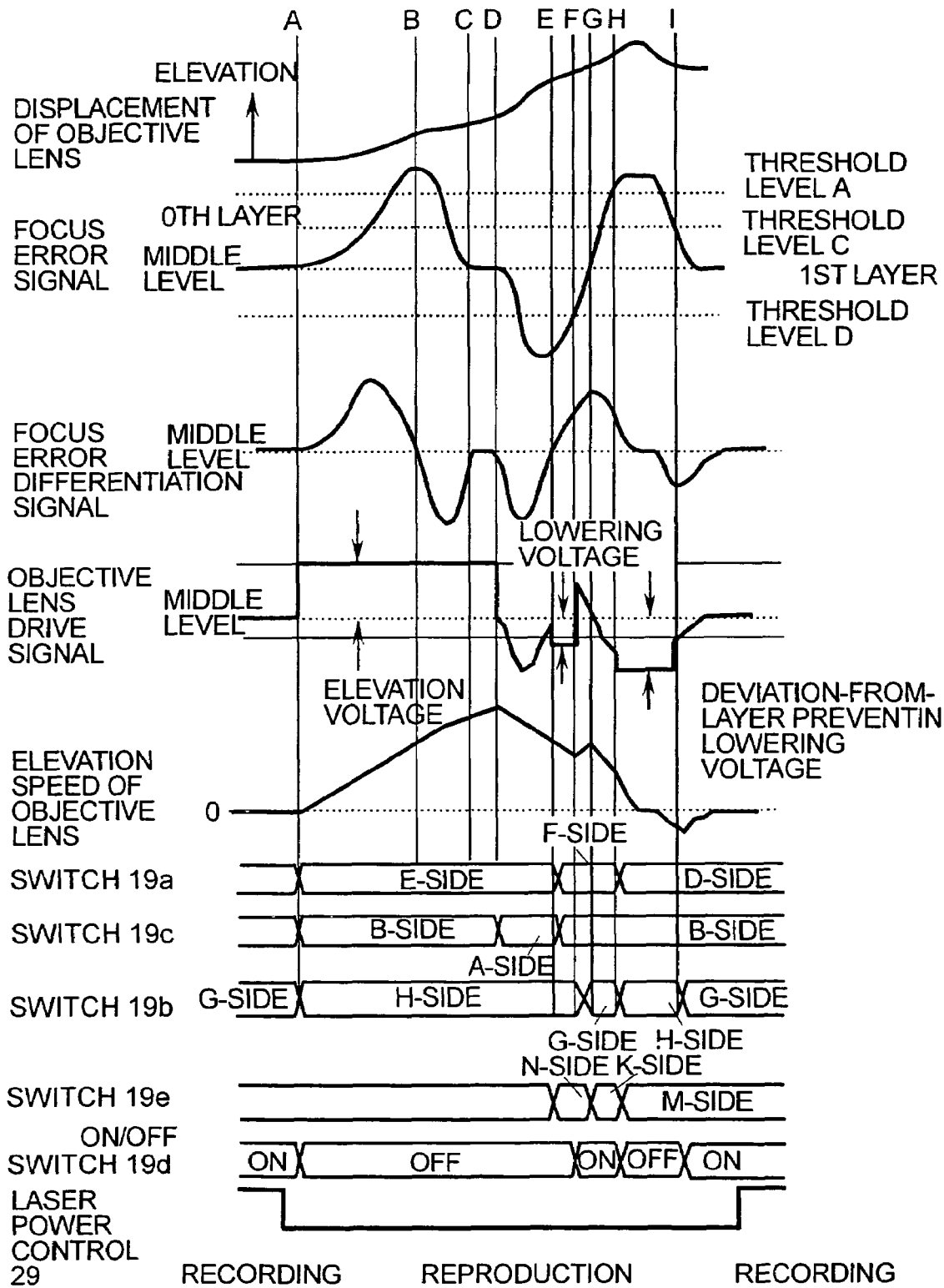
FIG. 16 is a timing chart showing another specific example of how the individual circuits operate in a focus jump from a 0th-layer focus point to a first-layer focus point in the optical disc apparatus of FIG. 14.

FIG. 16 similarly shows a case that the objective lens 3 is focused on the 0th recording layer and it is desired to move the focus position of the objective lens 3 to the first layer recording layer (i.e., it is desired to jump from a focus point corresponding to the lower (0th) recording layer to that corresponding to the upper (first) recording layer), and that the acceleration voltage (elevation voltage 16) is too high relative to the deceleration voltage (lowering voltage 17) and hence, if no proper measure were taken, the objective lens 3 would continue to ascend even after reaching a position where it is focused on the upper (first) recording layer (i.e., an upper-layer focus point would be passed) and reach a position where a feedback loop focus control for the upper recording layer cannot be performed satisfactorily.

Referring to FIG. 16, the controls on the objective lens 3 from time point A to F are the same as described above. That is, the elevation voltage value 16 is applied first. After the focus position has passed through the interlayer region between the 0th recording layer and the first recording layer, a speed control is performed by using a signal obtained by the differentiation circuit 12's differentiating the focus error signal that is supplied from the signal processing circuit 7.

In the above description that was made with reference to FIG. 15, it was assumed that the speed control makes the elevation speed sufficiently low in the vicinity of time point E, after time point E the application of the lowering voltage value 17 further decreases the elevation speed, and the elevation speed becomes zero in the vicinity of time point G. In contrast, in the case of FIG. 16, the elevation speed after time point E is so high that the application of the lowering voltage value 17 cannot brake the objective lens 3 sufficiently and its elevation speed is not decreased much. The feedback loop focus control using the focus error signal that is started at time point F cannot decrease the elevation speed to zero even at time point G when the objective lens 3 is focused on the upper (first) recording layer. The objective lens 3 goes past and deviates from the position corresponding to time point G where it is focused on the upper recording layer; pulling into focus cannot be attained.

In view of the above, after detecting the passage of time point E, the microcomputer 13 issues, to the changeover switch 19e, an instruction to switch to the N-side, where by the threshold level D (28d) is supplied to the comparison circuit 22. The comparison circuit 22 compares the focus error signal that is supplied from the signal processing circuit 7 with the threshold level D (28d). As the objective lens 3 continues to ascend, the level of the focus error signal exceeds the threshold level D (28d) at time point F. The comparison circuit 22 supplies a comparison detection signal to that effect to the microcomputer 13. In response to this comparison detection signal, the microcomputer 13 switches the changeover switch 19b to the G-side, whereby a feedback loop focus control using the focus error signal is started.

After the passage of time point F, the microcomputer 13 issues, to the changeover switch 19e, an instruction to switch to the K-side, whereby the threshold level A (28a) is supplied to the comparison circuit 22. The comparison circuit 22 compares the focus error signal that is supplied from the signal processing circuit 7 with the threshold level A (28a) and supplies a comparison result to the microcomputer 13.

Although the feedback loop focus control is performed, the elevation speed is not decreased. As the objective lens 3 goes up further, time point G is passed and the level of the focus error signal exceeds the threshold level A (28a) at time point H. The comparison circuit 22 supplies a comparison detection signal to that effect to the microcomputer 13. Detecting the passage of time point II based on the comparison detection signal, the microcomputer 13 switches the changeover switch 19b to the H-side and opens the on/off switch 19d. Because of the switching of the changeover switch 19b and the on/off switch 19d, the feedback loop that has been used so far for controlling the objective lens 3 is again made an open loop.

At this time, the microcomputer 13 issues, to the changeover switches 19a and 19c, instructions to switch to the D-side and B-side, respectively. Because of the switching of the changeover switch 19a to the D-side, the changeover switch 19a outputs the deviation-from-layer preventing lowering voltage 27. The adder 18 adds together a signal that is free of high-frequency components (rejected by the LPF 14) and the deviation-from-layer preventing lowering voltage 27, and supplies a resulting addition signal to the changeover switch 19c. Since the changeover switch 19c is switched to the B-side, the addition signal is supplied from the changeover switch 19c to the changeover switch 19b as it is. Since the changeover switch 19b is switched to the H-side, the addition signal is supplied, via the changeover switch 19b, to the pickup 4, where it is applied to the actuator for driving the objective lens 3. As a result, because of the application of the lowering voltage 27 to the actuator, the elevation speed of the ascending objective lens 3 is decreased to zero and the objective lens 3 starts to go down.

Since the objective lens 3 goes down, its focus position can be prevented from deviating from the upper recording layer. As the objective lens 3 goes down, the microcomputer 13 issues, to the changeover switch 19e, an instruction to switch to the M-side, whereby the threshold level C (28c) is supplied to the comparison circuit 22. The comparison circuit 22 compares the focus error signal that is supplied from the signal processing circuit 7 with the threshold level C (28c) and supplies a comparison result to the microcomputer 13. As the objective lens 3 goes down further, the level of the focus error signal becomes lower than the threshold level C (28c) at time point I. The comparison circuit 22 supplies a comparison detection signal to that effect to the microcomputer 13. In response to the comparison detection signal, the microcomputer 13 switches the changeover switch 19b to the G-side, whereby a feedback loop focus control using the focus error signal is started. At this time, the focus position of the objective lens 3 is close to the first recording layer and is located in such a region that a feedback loop focus control using the focus error signal can be performed successfully. Further, the lowering speed of the objective lens 3 is so low that a feedback loop focus control can be performed successfully. Therefore, the objective lens 3 can be pulled into a position where it is focused on the first recording layer.

After the objective lens 3 is pulled into the position where it is focussed on the first recording layer, the current position of the objective lens 3 is detected based on an ID or the like and the objective lens 3 is moved in the direction (tracking direction) parallel with the disc 1 to a target position where recording on the first recording layer should be started. After the objective lens 3 is moved to the target position, the microcomputer 13 controls the laser power control circuit 29 so that the semiconductor laser 52 (see FIG. 5), which has so far emitted low-power laser light for reproduction, emits high-power laser light for recording. This makes it possible to record data on an intended portion of the first recording layer.

Figure 17:
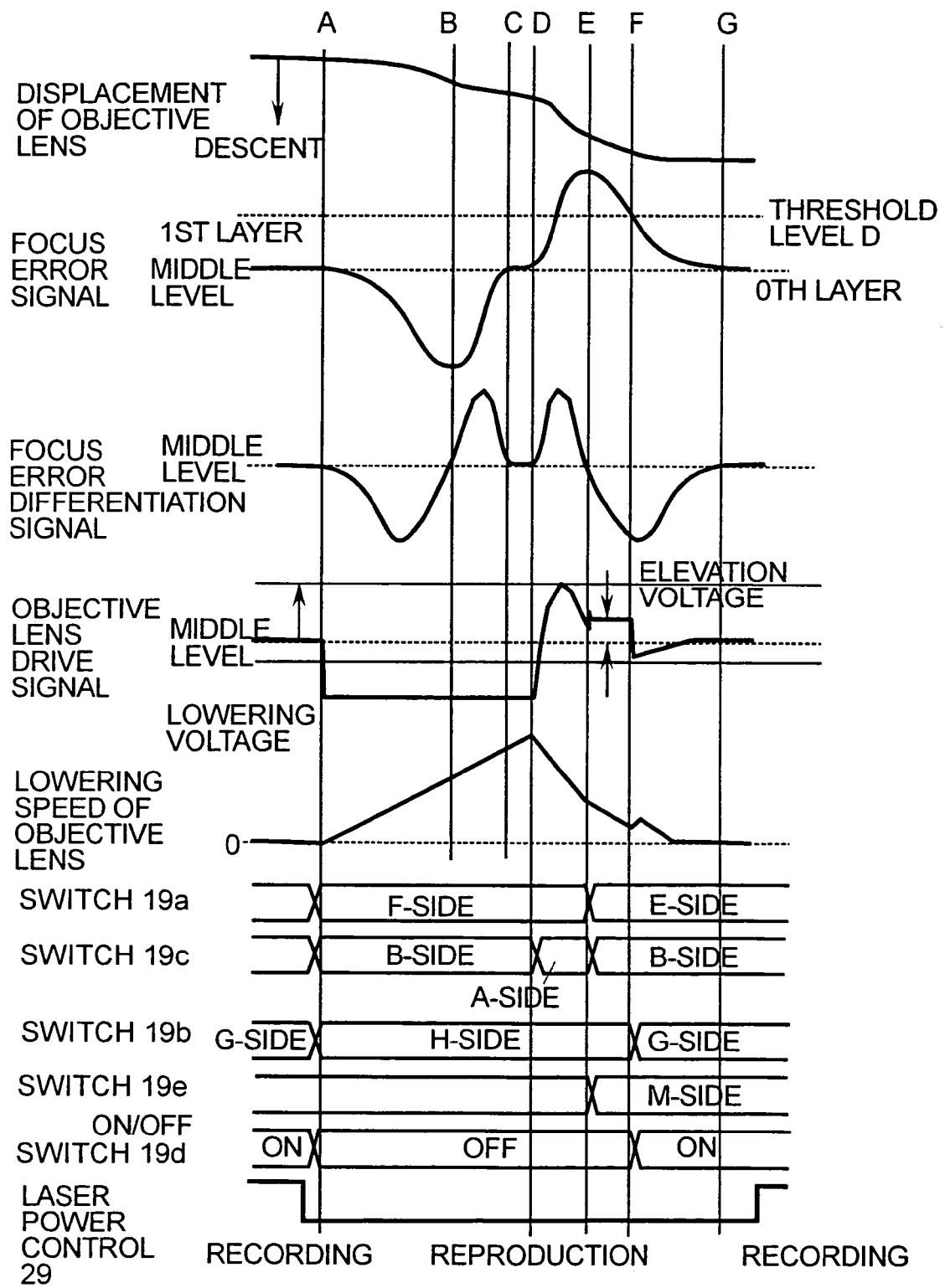
FIG. 17 is a timing chart showing a specific example of how the individual circuits operate in a focus jump from a first-layer focus point to a 0th-layer focus point in the optical disc apparatus of FIG. 14.

FIG. 17 shows a case that the objective lens 3 is located at such a position as to be focused on the first recording layer and data is being recorded on the first recording layer, and that it is desired to move the focus position of the objective lens 3 to the 0th recording layer because data should be recorded on a portion of the 0th recording layer next (i.e., it is desired to jump from a focus point corresponding to the upper (first) recording layer on which data is being recorded to a focus point corresponding to the lower (0th) recording layer). FIG. 17 shows a displacement variation of the objective lens 3, a focus error signal, a signal (hereinafter referred to as "differentiation signal") obtained by differentiating the focus error signal, a focus drive signal for driving the and a laser power control signal. The vertical axis represents the magnitudes of the displacement and the signals, and the horizontal axis represents time.

First, it is assumed that the apparatus is in a steady state in which a feedback loop focus control is being performed in a state that a focus point corresponding to the first recording layer is established.

To cause a focus jump to a focus point corresponding to the 0th recording layer while recording data on the first recording layer, the microcomputer 13 sets initial values of a constant lowering voltage value 17 that is an acceleration voltage value necessary for the interlayer movement, a constant elevation voltage value 16 that is a deceleration voltage value necessary to decelerate and stop, after acceleration, the objective lens 3 at a position corresponding to a 0th-layer focus point, a deviation-from-layer preventing elevation voltage 26 that is a deceleration voltage value necessary to prevent the focus position of the objective lens 3 from going past and deviating from the target 0th recording layer after the focus jump, a deviation-from-layer preventing lowering voltage 27 that is an acceleration voltage value necessary to prevent the objective lens 3 from returning to the first recording layer from which the focus jump started, a threshold level A (28*a*), a threshold level B (28*b*), a threshold value C (28*c*), a threshold value D (28*d*), and a gain factor 20.

After setting those initial values and before starting the focus jump, the microcomputer 13 controls the laser power control circuit 29 so that the semiconductor laser 52, which has so far emitted high-power laser light for recording, emits low-power laser light for reproduction. Changing the power of the semiconductor laser 52 to the low power for reproduction prevents an event that recorded data of another recording layer or an adjacent track is erased or rewritten erroneously during the focus jump.

After the power of the semiconductor laser 52 has been changed to the low power for reproduction, the focus jump is performed in the following manner. First, the microcomputer 13 switches the changeover switches 19*b* and 19*c* to the H-side and the B-side, respectively, and opens the on/off switch 19*d*. As a result of the switching of the changeover switch 19*b* and the on/off switch 19*d*, the feedback loop by which the objective lens 3 has been controlled so far is made an open loop and the focus control is stopped.

Then, the microcomputer 13 issues, to the changeover switch 19*a*, an instruction to switch to the F-side, whereby the lowering voltage value 17 is supplied to the adder 18. The adder 18 adds the lowering voltage value 17 to a signal that is free of high-frequency noise components (rejected by the LPF 14), and supplies a resulting addition signal to the changeover switch 19*c*. Since the changeover switch 19*c* is switched to the B-side, the addition signal is supplied from the changeover switch 19*c* to the changeover switch 19*b* as it is. Since the changeover switch 19*b* is switched to the H-side, the addition signal is supplied to the pickup 4 via the changeover switch 19*b*. Since the lowering voltage value 17 is applied to the actuator, the objective lens 3 starts to go down.

Referring to FIG. 17, the operation will be described below in detail for each of sections that are defined by time points A–G.

When the objective lens 3 goes down after the focus jump was started at time point A, the focus error signal falls gradually from a level close to the middle level until time point B. In this section from time point A to B, a signal (a focus error differentiation signal (hereinafter referred to merely as "differentiation signal")) obtained by differentiating the focus error signal falls gradually from a level close to the middle level, reaches a minimum value, then gradually increases, and finally returns to the middle level (zero) at time point B when the focus error signal has a minimum value. As the objective lens 3 goes down further, at time point C the focus position enters the interlayer region between the first recording layer and the 0th recording layer. The focus error signal increases gradually from the minimum value and reaches the middle level (zero). In the section from time point B to C, the differentiation signal increases from the middle level (zero), reaches a maximum value, then decreases gradually, and finally reaches the middle level (zero) again. In the section from time point C to D that corresponds to the interlayer region, both of the focus error signal and the differentiation signal are at the middle level (zero). As the objective lens 3 goes down further, the focus position enters the 0th layer region and hence the focus error signal rises gradually from a level close to the middle level until time point E. In the section from time point D to E, the difference signal rises gradually from a level close to the middle level, reaches a maximum value, then gradually decreases, and finally reaches the middle level (zero) at time point E when the focus error signal has a maximum value. As the objective lens 3 goes down further, a 0th-layer focus point is established at time point G. The focus error signal gradually decreases from the maximum value and reaches the middle level (zero). In the section from time point E to G, the differentiation signal decreases from the middle level (zero), reaches a minimum value, then increases gradually, and finally reaches the middle level (zero). At time point G when the 0th-layer focus point is established, the focus error signal and the differentiation signal reach the respective middle levels (zero).

By using the differentiation signal, more specifically, by detecting a time point (zero-cross point) when the differentiation signal crosses the middle level (zero), a position of the objective lens 3 corresponding to time point B can be detected easily and reliably. Although time point B can also be detected by monitoring the level of the focus error signal, the detection is not reliable because the amplitude of the focus error signal varies depending on the disc, for example, and hence is not uniform.

Therefore, the differentiation signal that is output from the differentiation circuit 12 is supplied to the microcomputer 13. The microcomputer 13 detects that the objective lens 3 has passed a position corresponding to time point B by detecting a time point (zero-cross point) when the differentiation signal received reaches the middle level (zero). When detecting the passage of time point B first time, next the microcomputer 13 detects a zero-cross point (time point C) of the focus error signal. As the objective lens 3 goes down further, it passes the end position, corresponding to time point D, of the interlayer region between the first recording layer and the 0th recording layer. When detecting time point D by monitoring the level of the focus error signal, to apply a voltage value for decelerating the descending objective lens 3 to the actuator, the microcomputer 13 issues, to the changeover switch 19*c*, an instruction to switch to the A-side.

On the other hand, the focus error signal that is output from the signal processing circuit 7 is supplied to the differentiation circuit 12, which generates a differentiation signal and supplies it to the multiplier 21. The multiplier 21 multiplies the received differentiation signal by the gain factor 20 and supplies a multiplication result to the changeover switch 19*c*. Since at this time the changeover switch 19*c* is switched to the A-side, the multiplication signal is supplied to the changeover switch 19*b* via the changeover switch 19*c* as it is. Since the change over switch 19*b* is switched to the H-side, the multiplication signal that was obtained by multiplying the differentiation signal by the gain factor 20 is supplied to the actuator as a deceleration voltage via the changeover switch 19*b*.

In the section from time point D to E, the focus error signal reflects the displacement of the objective lens 3 (it increases monotonously). As described above, the signal obtained by differentiating the focus error signal represents the movement speed of the objective lens 3. For example, if a high lowering voltage has been applied to the actuator and hence a lowering speed of the objective lens 3 when switching is made to the deceleration voltage is high, the focus error signal rises steeply from time point D to E. Therefore, a signal obtained by differentiating such a focus error signal has a large value, that is, the deceleration voltage has a large value, which means that the force of decreasing the lowering speed of the objective lens 3 is strong. Conversely, if a low lowering voltage has been applied to the actuator and hence a lowering speed of the objective lens 3 when switching is made to the deceleration voltage is low, the focus error signal rises gently from time point D to E. Therefore, a signal obtained by differentiating such a focus error signal has a small value, that is, the deceleration voltage has a small value, which means that the force of decreasing the lowering speed of the objective lens 3 is weak.

A deceleration voltage value corresponding to a lowering speed of the objective lens 3 can be obtained and the lowering speed of the objective lens 3 can be decreased by using a signal obtained by differentiating the focus error signal from time D to E in the above-described manner. The gain factor 20 is used for adjusting the amplitude of the deceleration voltage (differentiation voltage) that is obtained by differentiating the focus error signal.

The objective lens 3 continues to go down owing to the acceleration that was given by the lowering voltage 17 even after the application of the deceleration voltage to the actuator. After the application of the deceleration voltage to the actuator, the microcomputer 13 judges that time point E has been passed by detecting a time point (zero-cross point) when the differentiation signal that is supplied from the differentiation circuit 12 reaches the middle level (zero) again. When detecting the passage of time point E, to stop stably the objective lens 3 that is about to make a transition from descent to ascent and to establish a 0th-layer focus point (time point G in FIG. 17), the microcomputer 13 issues, to the changeover switches 19a and 19c, instructions to switch to the E-side and the B-side, respectively. Switched to the E-side, the changeover switch 19a outputs the elevation voltage value 16.

The adder 18 adds together the elevation voltage value 16 and a signal that is free of high-frequency noise components (rejected by the LPF 14), and supplies a resulting addition signal to the changeover switch 19c. Since the changeover switch 19c is switched to the B-side, the addition signal is supplied from the changeover switch 19c to the changeover switch 19b as it is. Since the changeover switch 19b is switched to the H-side, the addition signal is supplied, via the changeover switch 19b, to the pickup 4, where it is applied to the actuator for driving the objective lens 3. Because of the application of the elevation voltage value 16 to the actuator, the lowering speed of the objective lens 3 is decreased and the objective lens 3 stops descending.

After detecting the passage of time point E, the microcomputer 13 issues, to the changeover switch 19e, to switch to the M-side, whereby the threshold level C (28c) is supplied to the comparison circuit 22. The comparison circuit 22 compares the focus error signal that is supplied from the signal processing circuit 7 with the threshold level C (28c), and supplies a comparison result to the microcomputer 13. As the objective lens 3 continues to descend, the level of the focus error signal becomes lower than the threshold level C (28c) at time point F. The comparison circuit 22 supplies a comparison detection signal to that effect to the microcomputer 13. In response to this comparison detection signal, the microcomputer 13 switches the changeover switch 19b to the G-side. The speed of the objective lens 3 is equal to zero when it is focused at a position close to the 0th recording layer. Therefore, a feedback loop focus control using the focus error signal is started, whereby the objective lens 3 can be pulled into a position where it is focused on the 0th recording layer.

FIG. 17 shows a case that the elevation voltage and the lowering voltage are well balanced. In this case, the elevation speed of the objective lens 3 becomes zero when it is focused at a position close to the first layer recording layer, and the objective lens 3 is pulled into a position where it is focused on the first recording layer without making a transition to ascent.

After the objective lens 3 is pulled into the position where it is focused on the 0th recording layer, the current position of the objective lens 3 is detected based on an ID or the like and the objective lens 3 is moved in the direction (tracking direction) parallel with the disc 1 to a target position where recording on the 0th recording layer should be started. After the objective lens 3 is moved to the target position, the microcomputer 13 controls the laser power control circuit 29 so that the semiconductor laser 52 (see FIG. 5), which has so far emitted low-power laser light for reproduction, emits high-power laser light for recording. This makes it possible to record data on an intended portion of the first recording layer.

Figure 18:
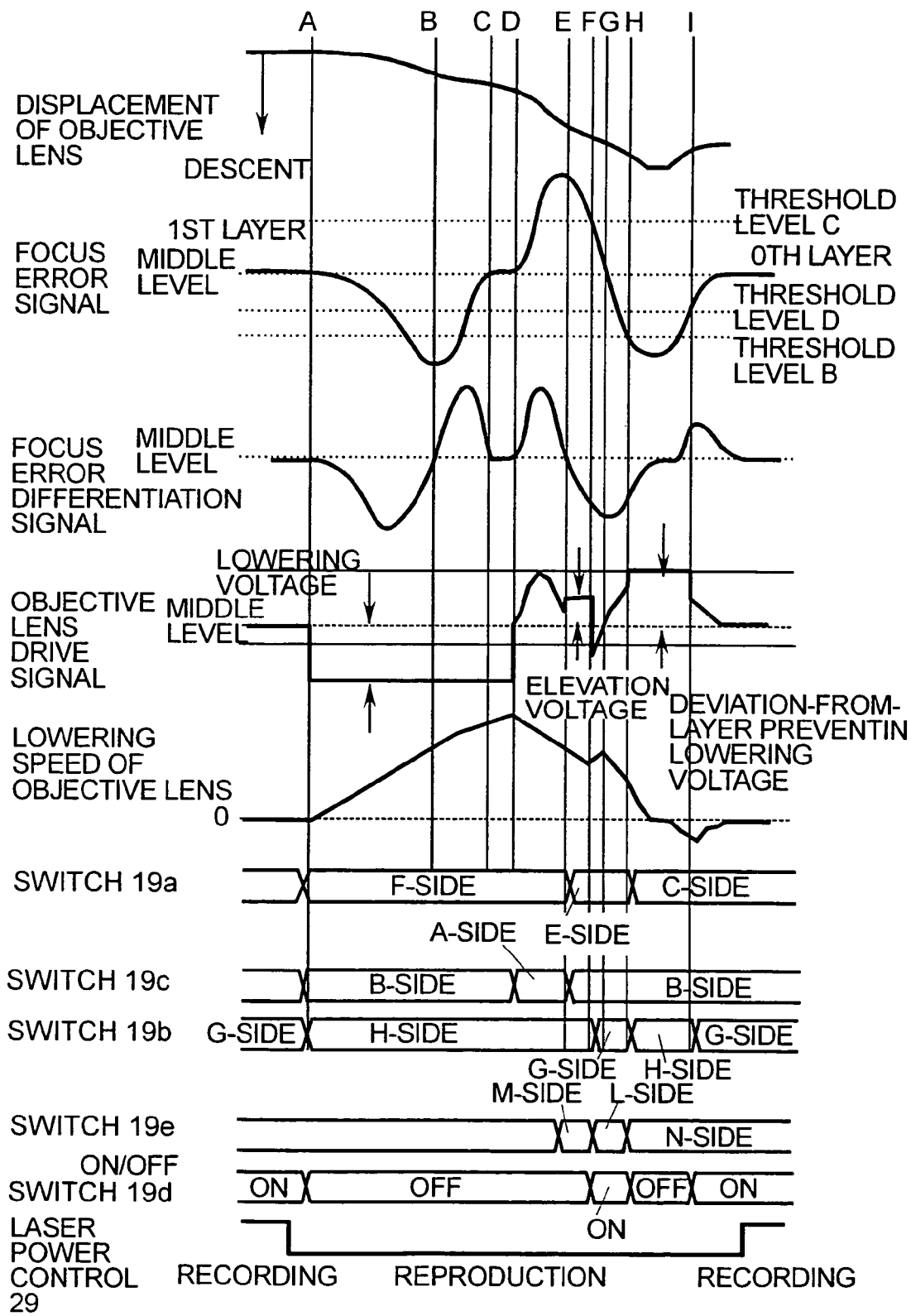
FIG. 18 is a timing chart showing another specific example of how the individual circuits operate in a focus jump from a first-layer focus point to a 0th-layer focus point in the optical disc apparatus of FIG. 14.

FIG. 18 similarly shows a case that the objective lens 3 is focused on the first recording layer and it is desired to move the focus position of the objective lens 3 to the 0th layer recording layer (i.e., it is desired to jump from a focus point corresponding to the upper (first) recording layer to that corresponding to the lower (0th) recording layer), and that the acceleration voltage (lowering voltage 17) is too high relative to the deceleration voltage (elevation voltage 16) and hence, if no proper measure were taken, the objective lens 3 would continue to descend even after reaching a position where it is focused on the lower (0th) recording layer (i.e., a lower-layer focus point would be passed) and reach a position where a feedback loop focus control for the lower recording layer cannot be performed satisfactorily.

Referring to FIG. 18, the controls on the objective lens 3 from time point A to F are the same as described above. That is, the lowering voltage value 17 is applied first. After the focus position has passed through the interlayer region between the first recording layer and the 0th recording layer, a speed control is performed by using a signal obtained by the differentiation circuit 12's differentiating the focus error signal that is supplied from the signal processing circuit 7.

In the above description that was made with reference to FIG. 17, it was assumed that the speed control makes the lowering speed sufficiently low in the vicinity of time point E, after time point E the application of the elevation voltage value 16 further decreases the lowering speed, and the lowering speed becomes zero in the vicinity of time point G. In contrast, in the case of FIG. 18, the lowering speed after time point E is so high that the application of the elevation voltage value 16 cannot brake the objective lens 3 sufficiently and its elevation speed is not decreased much. The feedback loop focus control using the focus error signal that is started at time point F cannot decrease the lowering speed to zero even at time point G when the objective lens 3 is focused on the lower (0th) recording layer. The objective lens 3 goes past and deviates from the position corresponding to time point G where it is focused on the lower recording layer; pulling into focus cannot be attained.

In view of the above, after detecting the passage of time point E, the microcomputer 13 issues, to the changeover switch 19e, an instruction to switch to the M-side, whereby the threshold level C (28c) is supplied to the comparison circuit 22. The comparison circuit 22 compares the focus error signal that is supplied from the signal processing circuit 7 with the threshold level C (28c). As the objective lens 3 continues to descend, the level of the focus error signal becomes lower the threshold level C (28c) at time point F. The comparison circuit 22 supplies a comparison detection signal to that effect to the microcomputer 13. In response to this comparison detection signal, the microcomputer 13 switches the changeover switch 19b to the G-side, whereby a feedback loop focus control using the focus error signal is started.

After detecting the passage of time point F, the microcomputer 13 issues, to the changeover switch 19e, an instruction to switch to the L-side, whereby the threshold level B (28b) is supplied to the comparison circuit 22. The comparison circuit 22 compares the focus error signal that is supplied from the signal processing circuit 7 with the threshold level B (28b) and supplies a comparison result to the microcomputer 13. Although the feedback loop focus control is performed, the lowering speed is not decreased. As the objective lens 3 goes down further, time point G is passed and the level of the focus error signal becomes lower than the threshold level B (28b) at time point H. The comparison circuit 22 supplies a comparison detection signal to that effect to the microcomputer 13. Detecting the passage of time point H based on the comparison detection signal, the microcomputer 13 switches the changeover switch 19b to the H-side and opens the on/off switch 19d. Because of the switching of the changeover switch 19b and the on/off switch 19d, the feedback loop that has been used so far for controlling the objective lens 3 is again made an open loop.

At this time, the microcomputer 13 issues, to the changeover switches 19a and 19c, instructions to switch to the C-side and B-side, respectively. Because of the switching of the changeover switch 19a to the C-side, the changeover switch 19a outputs the deviation-from-layer preventing elevation voltage 26. The adder 18 adds together a signal that is free of high-frequency components (rejected by the LPF 14) and the deviation-from-layer preventing elevation voltage 26, and supplies a resulting addition signal to the changeover switch 19c. Since the changeover switch 19c is switched to the B-side, the addition signal is supplied from the changeover switch 19c to the changeover switch 19b as it is. Since the changeover switch 19b is switched to the H-side, the addition signal is supplied, via the changeover switch 19b, to the pickup 4, where it is applied to the actuator for driving the objective lens 3. As a result, because of the application of the elevation voltage 26 to the actuator, the lowering speed of the descending objective lens 3 is decreased to zero and the objective lens 3 starts to go up. Since the objective lens 3 goes up, its focus position call be prevented from deviating from the lower recording layer.

As the objective lens 3 goes up, the microcomputer 13 issues, to the changeover switch 19e, an instruction to switch to the N-side, whereby the threshold level D (28d) is supplied to the comparison circuit 22. The comparison circuit 22 compares the focus error signal that is supplied from the signal processing circuit 7 with the threshold level D (28d) and supplies a comparison result to the microcomputer 13.

As the objective lens 3 goes up further, the level of the focus error signal exceeds the threshold level D (28d) at time point I. The comparison circuit 22 supplies a comparison detection signal to that effect to the microcomputer 13. In response to the comparison detection signal, the microcomputer 13 switches the changeover switch 19b to the G-side, whereby a feedback loop focus control using the focus error signal is started. At this time, the focus position of the objective lens 3 is close to the 0th recording layer and is located in such a region that a feedback loop focus control using the focus error signal can be performed successfully. Further, the elevation speed of the objective lens 3 is so low that a feedback loop focus control can be performed successfully. Therefore, the objective lens 3 can be pulled into a position where it is focused on the 0th recording layer.

After the objective lens 3 is pulled into the position where it is focused on the 0th recording layer, the current position of the objective lens 3 is detected based on an ID or the like and the objective lens 3 is moved in the direction (tracking direction) parallel with the disc 1 to a target position where recording on the 0th recording layer should be started. After the objective lens 3 is moved to the target position, the microcomputer 13 controls the laser power control circuit 29 so that the semiconductor laser 52 (see FIG. 5), which has so far emitted low-power laser light for reproduction, emits high-power laser light for recording. This makes it possible to record data on an intended portion of the 0th recording layer.

The way a maximum value and a minimum value occur in the focus error signal as the objective lens 3 goes up and down may be entirely opposite to the above depending on how the outputs of the photodetector 54 are connected to the error amplifier 55 (see FIG. 5). Where a maximum value and a minimum value occur in the opposite manner, naturally it is proper to think about the operation of the apparatus bearing in mind that a maximum value and a minimum value occur in the opposite manner for the above reason.

A focus jump during data recording, which has been described above, is necessary in a case where during continuous data recording there occurs data whose addresses bridge two recording layers. Such a focus jump is started in processing an address portion that is not to be recorded on the disc 1 after writing of a data portion. Data can be recorded continuously after the target address is reached.

Figure 19:
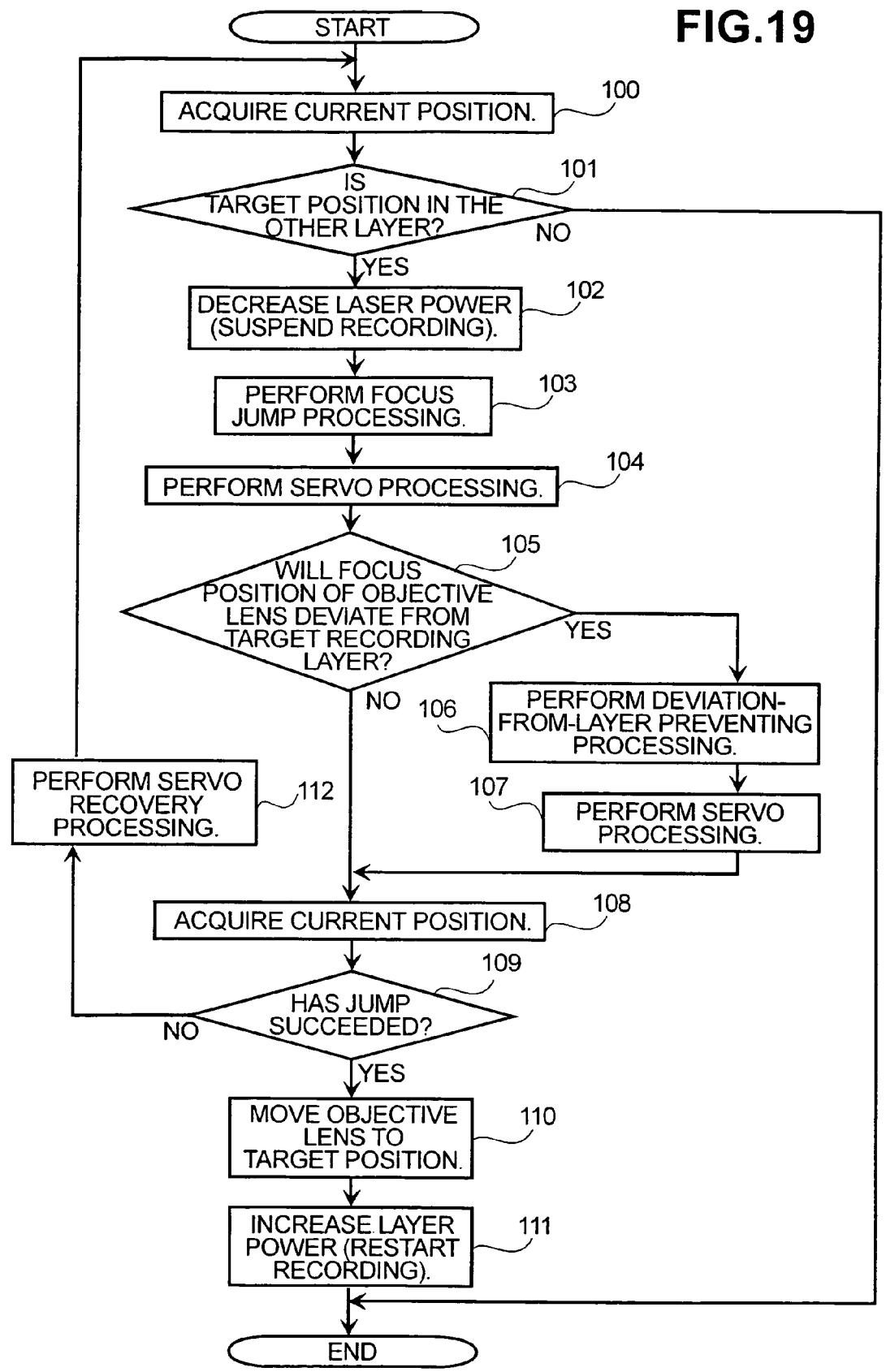
FIG. 19 is a flowchart showing a specific example of a focus jump control algorithm of a microcomputer in the optical disc apparatus of FIG. 14.

The above-described individual controls of a focus jump during data recording are performed by the microcomputer 13. FIG. 19 shows an algorithm of those controls.

Referring to FIG. 19, to start a focus jump during recording, first, at step 100 physical address information that is stored in the optical disc 1 is acquired and the current address of the objective lens 3 is checked. At step 101, it is judged whether the recording layer on which data should be recorded next is the same layer as the current recording layer. If it is judged at step 101 that the recording layer on which data should be recorded next is the same layer as the current recording layer, it is not necessary to perform a focus jump and hence the process is finished. On the other hand, if it is judged that *the recording layer on which data should be recorded next is not the current recording layer, a focus jump is performed. Before starting a focus jump, the laser power is changed to the low power for reproduction. The recording is suspended at this stage (step 102). When the laser power has become the lower power for reproduction, focus jump processing (described above) is performed at step 103.

After the focus jump processing has been performed, at step 104 focus servo processing is performed so that the focus position of the objective lens 3 is pulled into the target recording layer. At step 105, deviation-from-layer detection processing (described above) is performed. If it is judged at step 105 that the feedback loop focus control cannot attain pulling into focus and the focus position of the objective lens 3 deviates from the target recording layer, deviation-fromlayer preventing processing is performed at step 106. At step 107, focus servo processing is performed again so that the focus position of the objective lens 3 is pulled into the target recording layer. At step 108, a current position is acquired. At step 109, it is checked whether the focus jump to the recording layer on which data should be recorded next has been performed normally. This can be judged by monitoring a focus error signal or some other servo-related signal during or after the focus jump or by using the post-jump current address that was acquired at step 108.

If the focus jump to the recording layer on which data should be recorded next has succeeded, at step 110 the objective lens 3 is moved in the direction (tracking direction) parallel with the disc 1 to a target position from which data recording should be restarted. After the objective lens 3 has been moved to the position from which data recording should be restarted, at step 111 the laser power is increased to the high power for recording and data recording is restarted.

If it is judged at step 109 that the focus jump has failed, servo recovery processing is performed at step 112. In general, if a focus jump does not result in pulling into a target recording layer, the subjects of the focus control and the other controls are out of those controls. Therefore, servo recovery processing such as re-pulling-in of the focus control are performed when necessary. After the focus control and other servo controls have recovered, step 100 and the following steps are executed again. According to the above algorithm, the microcomputer 13 can control a focus jump in a stable manner.

As described above, in this embodiment, in performing a focus jump during recording on a disc having a plurality of data-recordable recording layers, the laser power is controlled so as to become too low to effect recording, whereby erroneous erasure of an already recorded portion can be prevented and a focus jump can be performed even during recording. Further, an event that the focus position of the objective lens 3 is going to deviate from the target recording layer is detected at the end of a focus jump by detecting that the level of a focus error signal exceeds a set threshold level, and the actuator is controlled so as to prevent the focus position of the objective lens 3 from deviating from the target recording layer. This enables a stable focus jump even during recording.

As described above, the invention provides advantages that a focus jump can be performed in a stable manner by detecting the movement speed of the objective lens during a focus jump and variably controlling a deceleration voltage so that the degree of deceleration is made constant, and that a focus jump can be performed in a reliable manner by detecting an event that the objective lens starts to move in the direction opposite to the direction of an intended focus jump by monitoring a focus error signal during the focus jump and thereby preventing the objective lens from returning to a recording layer from which the focus jump was started.

Further, as for a focus jump during recording on a disc having a plurality of data-recordable recording layers, the invention provides advantages that erroneous erasure of an already recorded portion can be prevented and a focus jump can be performed even during recording by controlling the laser power so that it becomes too low to effect recording, and that a focus jump can be performed in a stable and reliable manner even during recording by detecting an event that the focus position of the objective lens is going to deviate from the target recording layer at the end of a focus jump by detecting that the level of a focus error signal exceeds a set threshold level and controlling the actuator so as to prevent the focus position of the objective lens from deviating from the target recording layer.

What is claimed is:

1. An optical disc apparatus having a focus jump function for enabling a focus control on each of a plurality of recording layers of a disc on and from which data can be recorded and reproduced, comprising:
    an objective lens for focusing laser light on a recording layer of the disc;
    focus error signal generating means for generating a focus error signal based on reflection light that is obtained through the objective lens;
    generating means for generating, based on the focus error signal, a focus control signal for controlling the objective lens in accordance with the focus control signal;
    drive voltage generating means for outputting a voltage necessary to move the objective lens;
    moving means for moving the objective lens in a direction approximately perpendicular to the recording layers of the disc in accordance with the output voltage of the drive voltage generating means; and
    deviation-from-layer detecting means for detecting whether a focus position of the objective lens will deviate from a recording layer,
    wherein when a focus jump is performed, whether a focus position of the objective lens will deviate from a destination recording layer is detected and deviation from the destination recording layer is prevented by controlling the moving means; wherein the drive voltage generating means generates:
    a first voltage value as an acceleration voltage that causes the objective lens to approach the disc and a second voltage value as a deceleration voltage that causes the objective lens to go away from the disc in moving the objective lens from a first recording layer to a second recording layer that is more distant from the objective lens than the first recording layer is, and
    a third voltage value as an acceleration voltage that causes the objective lens to go away from the disc and a fourth voltage value as a deceleration voltage that causes the objective lens to approach the disc in moving the objective lens from a third recording layer to a fourth recording layer that is closer to the objective lens than the third recording layer is.

2. An optical disc apparatus having a focus jump function for enabling a focus control on each of a plurality of recording layers of a disc on and from which data can be recorded and reproduced, comprising:
    an objective lens for focusing laser light on a recording layer of the disc;
    focus error signal generating means for generating a focus error signal based on reflection light that is obtained through the objective lens;
    generating means for generating, based on the focus error signal, a focus control signal for controlling the objective lens;
    drive voltage generating means for outputting a voltage necessary to move the objective lens in accordance with the focus control signal;
    moving means for moving the objective lens in a direction approximately perpendicular to the recording layers of the disc in accordance with the output voltage of the drive voltage generating means; and
    deviation-from-layer detecting means for detecting whether a focus position of the objective lens will deviate from a recording layer, wherein when a focus jump is performed, whether a focus position of the objective lens will deviate from a destination recording layer is detected and deviation from the destination recording layer is prevented by controlling the moving means; and wherein the focus jump is necessary in a case where during continuous data recording there occurs data whose addresses bridge two recording layers, and the focus jump is started in processing an address portion that is not to be recorded on the disc after writing of a data portion.

3. An optical disc apparatus having a focus jump function for enabling a focus control on each of a plurality of recording layers of a disc on and from which data can be recorded and reproduced, comprising:

an objective lens for focusing laser light on a recording layer of the disc;

a signal processing circuit for generating a focus error signal based on reflection light that is obtained through the objective lens;

a focus control circuit for generating, based on the focus error signal, a focus control signal for controlling the objective lens;

a drive voltage generating circuit for outputting a drive voltage necessary to move a focus position of the objective lens between recording layers in accordance with the focus control signal;

an actuator for moving the objective lens in a direction approximately perpendicular to the recording layers of the disc in accordance with the output voltage of the drive voltage generating circuit; and a comparison circuit for detecting, based on a level of the focus error signal, whether a focus position of the objective lens will deviate from a recording layer, wherein when a focus jump is performed, whether the focus position of the objective lens will deviate from a destination recording layer is detected and deviation from the destination recording layer is prevented by controlling the actuator; and wherein the focus jump is necessary in a case where during continuous data recording there occurs data whose addresses bridge two recording layers, and the focus jump is started in processing an address portion that is not to be recorded on the disc after writing of a data portion.

4. An optical disc apparatus having a focus jump function for enabling a focus control on each of a plurality of recording layers of a disc on and from which data can be recorded and reproduced, comprising:

an objective lens for focusing laser light on a recording layer of the disc;

focus error signal generating means for generating a focus error signal based on reflection light that is obtained through the objective lens;

generating means for generating, based on the focus error signal, a focus control signal for controlling the objective lens;

drive voltage generating means for outputting a voltage necessary to move the objective lens in accordance with the focus control signal;

moving means for moving the objective lens in a direction approximately perpendicular to the recording layers of the disc in accordance with the output voltage of the drive voltage generating means; and deviation-from-layer detecting means for detecting whether a focus position of the objective lens will deviate from a recording layer, wherein when a focus jump is performed, whether a focus position of the objective lens will deviate from a destination recording layer is detected and deviation from the destination recording layer is prevented by controlling the moving means;

wherein the deviation-from-layer detecting means compares the level of the focus error signal with a set level, and detects whether the focus position of the objective lens will deviate from a recording layer based on a magnitude relationship between the level of the focus error signal and the set level; and wherein the focus jump is necessary in a case where during continuous data recording there occurs data whose addresses bridge two recording layers, and the focus jump is started in processing an address portion that is not to be recorded on the disc after writing of a data portion.

* * * * *